United States Patent [19]
Radican

[11] Patent Number: 6,148,291
[45] Date of Patent: Nov. 14, 2000

[54] CONTAINER AND INVENTORY MONITORING METHODS AND SYSTEMS

[75] Inventor: Joseph E. Radican, Rocky River, Ohio

[73] Assignee: K & T of Lorain, Ltd.

[21] Appl. No.: 09/013,392

[22] Filed: Jan. 26, 1998

[51] Int. Cl.[7] ............................ G06F 17/60; G06F 17/00; B07C 3/18
[52] U.S. Cl. .................. 705/28; 705/29; 705/22
[58] Field of Search .................... 705/22, 28, 29

[56] References Cited

U.S. PATENT DOCUMENTS

| | | | |
|---|---|---|---|
| H1743 | 8/1998 | Graves et al. | 364/479.06 |
| 4,336,589 | 6/1982 | Smith et al. | 705/28 |
| 4,509,123 | 4/1985 | Vereen | 364/300 |
| 4,563,739 | 1/1986 | Gerpheide et al. | 705/28 |
| 4,639,875 | 1/1987 | Abraham et al. | 700/236 |
| 4,920,488 | 4/1990 | Filley | 705/28 |
| 5,038,283 | 8/1991 | Caveney | 364/403 |
| 5,043,908 | 8/1991 | Manduley et al. | 364/428 |
| 5,117,096 | 5/1992 | Bauer et al. | 235/375 |
| 5,122,959 | 6/1992 | Nathanson et al. | 364/436 |
| 5,245,534 | 9/1993 | Waterhouse et al. | 705/28 |
| 5,434,775 | 7/1995 | Sims et al. | 705/8 |
| 5,455,409 | 10/1995 | Smith et al. | 235/385 |
| 5,493,491 | 2/1996 | Calcerano et al. | 364/403 |
| 5,505,585 | 4/1996 | Hubbard | 414/803 |
| 5,565,858 | 10/1996 | Guthrie | 340/825.35 |
| 5,568,393 | 10/1996 | Ando et al. | 700/214 |
| 5,630,072 | 5/1997 | Dobbins | 705/22 |
| 5,646,389 | 7/1997 | Bravman et al. | 235/383 |
| 5,646,616 | 7/1997 | Komatsu | 340/988 |
| 5,780,826 | 7/1998 | Hareyama et al. | 235/385 |
| 5,798,693 | 8/1998 | Engellenner | 340/103.3 |
| 5,831,860 | 11/1998 | Foladare et al. | 364/478.07 |

FOREIGN PATENT DOCUMENTS 2046147  7/1991  Canada ..................... B65G 1/137

OTHER PUBLICATIONS

Nunnally, Charles E., "Real–Time Audit Trail", Conference Proceedings of Southeastern '80, IEEE, Apr. 1980.

*Primary Examiner*—Tod R. Swann
*Assistant Examiner*—James W. Myhre
*Attorney, Agent, or Firm*—Arter & Hadden LLP

[57] ABSTRACT

Container and inventory monitoring methods and systems provide detailed logistical control of containers, shipping racks and resident and in-transit inventory. The methods and systems create and maintain accurate real-time records of the location, movement and load status of containers, racks and inventory within the facility boundaries and between facilities such as factories, assembly plants, warehouses, shipping yards and freight switching facilities. Detailed data on container switching, unloading and loading activity is recorded and archived. A virtual inventory accounting is provided by tracking from customer release orders to supplier shipments and rack returns.

35 Claims, 34 Drawing Sheets

DETAIL ON HAND

| CARRIER | CARRIER NAME | DATE | TIME | DOCK | YARD | STATUS | TRAILER | PACKING LIST |
|---|---|---|---|---|---|---|---|---|
| ADXR | A.D. TRANSPORT | 06/26/95 | 09:39 | | N | EMPTY | 16504 | |
| ADXR | A.D. TRANSPORT | 06/26/95 | 08:46 | | N | EMPTY | 92018 | |
| ADXR | A.D. TRANSPORT | 06/22/95 | 13:21 | | N | TRUCK LOAD | 92020 | |
| BGTH | BIG THREE EXPEDITERS | 06/21/95 | 01:51 | | N | PARTIAL LOAD | 482417 | |
| CAAY | C & A TRANSPORTATION | 06/26/95 | 02:55 | | N | TRUCK LOAD | 1916 | |
| CAAY | C & A TRANSPORTATION | 06/26/95 | 17:48 | | N | TRUCK LOAD | 1939 | |
| CAAY | C & A TRANSPORTATION | 06/26/95 | 02:57 | | N | TRUCK LOAD | 1945 | |
| CAAY | C & A TRANSPORTATION | 06/26/95 | 16:54 | | N | TRUCK LOAD | 1946 | |
| CAAY | C & A TRANSPORTATION | 06/26/95 | 02:57 | | N | TRUCK LOAD | 1949 | |
| CAAY | C & A TRANSPORTATION | 06/20/95 | 19:32 | | N | RACKS OUTBOUND | 1950 | |
| CAAY | C & A TRANSPORTATION | 06/26/95 | 02:56 | | N | TRUCK LOAD | 1951 | |
| CAAY | C & A TRANSPORTATION | 06/23/95 | 19:14 | | N | TRUCK LOAD | 1952 | |
| CAAY | C & A TRANSPORTATION | 06/27/95 | 02:54 | | N | RACKS OUTBOUND | 1954 | |
| CAAY | C & A TRANSPORTATION | 06/26/95 | 21:06 | | N | TRUCK LOAD | 1955 | |
| CAAY | C & A TRANSPORTATION | 06/27/95 | 03:57 | | N | RACKS OUTBOUND | 5308 | |
| CAAY | C & A TRANSPORTATION | 06/26/95 | 10:33 | 38 | N | | 5309 | |
| CAAY | C & A TRANSPORTATION | 06/27/95 | 03:17 | 37 | N | | 5318 | |

EMPTY TRAILER REPORT
UNNOTIFIED CARRIERS

120

| CARRIER | CARRIER NAME | TRAILER | DOCK | YARD | STATUS | PACKING LIST | RETENTION HOURS | |
|---|---|---|---|---|---|---|---|---|
| ADXR | A.D. TRANSPORT | 92020 | | N | TRUCK LOAD | | 115 | *PAST DUE* |
| BGTH | BIG THREE EXPEDITERS | 482417 | | N | PARTIAL LOAD | | 451 | *PAST DUE* |
| CAAY | C & A TRANSPORTATION | 1916 | | N | TRUCK LOAD | | 30 | *PAST DUE* |
| | | 1939 | | N | TRUCK LOAD | | 15 | *PAST DUE* |
| | | 1945 | | N | TRUCK LOAD | | 30 | *PAST DUE* |
| | | 1946 | | N | TRUCK LOAD | | 16 | *PAST DUE* |
| | | 1949 | | N | TRUCK LOAD | | 30 | *PAST DUE* |
| | | 1951 | | N | TRUCK LOAD | | 30 | *PAST DUE* |
| | | 1952 | | N | TRUCK LOAD | | 85 | *PAST DUE* |
| | | 1955 | | | TRUCK LOAD | | 11 | *PAST DUE* |
| | | 5309 | 38 | | TRUCK LOAD | | 30 | *PAST DUE* |
| | | 5318 | 37 | | TRUCK LOAD | | 30 | *PAST DUE* |
| | | 5325 | 32 | | TRUCK LOAD | | 12 | *PAST DUE* |
| | | 5332 | | | TRUCK LOAD | | 10 | *PAST DUE* |
| | | 700 | | | TRUCK LOAD | | 13 | *PAST DUE* |
| CIEG | CIMARRON EXPRESS | 48383 | | N | TRUCK LOAD | | 16 | *PAST DUE* |
| | | 485903 | | N | TRUCK LOAD | | 25 | *PAST DUE* |
| | | 534611 | | N | TRUCK LOAD | | 2 | *PAST DUE* |
| | | 538355 | | N | TRUCK LOAD | | 2 | *PAST DUE* |
| | | 851589 | 56 | | TRUCK LOAD | | 86 | *PAST DUE* |
| | | 851659 | | N | TRUCK LOAD | | 13 | *PAST DUE* |
| | | 851765 | | | TRUCK LOAD | | 18 | *PAST DUE* |
| CRBR | CREECH BROTHERS | 53151 | 62 | | PARTIAL LOAD | | 27 | *PAST DUE* |
| | | 5321 | | W | TRUCK LOAD | | 8 | *PAST DUE* |
| | | 53211 | | N | TRUCK LOAD | | 20 | *PAST DUE* |
| | | 53260 | 22 | S | TRUCK LOAD | | 28 | *PAST DUE* |
| | | 53281 | | S | TRUCK LOAD | | 24 | *PAST DUE* |
| | | 53331 | | | TRUCK LOAD | | 1 | *PAST DUE* |
| CUIT | CUSTOMIZED TRANSPORTATION INC. | 0519 | 3 | | TRUCK LOAD | | 10 | *PAST DUE* |
| | | 0520 | 59 | N | TRUCK LOAD | | 8 | *PAST DUE* |
| | | 0522 | | N | TRUCK LOAD | | 8 | *PAST DUE* |
| | | 0541 | 18 | | TRUCK LOAD | | 4 | *PAST DUE* |
| | | 0547 | | S | PARTIAL LOAD | | 90 | *PAST DUE* |
| | | 0582 | | N | TRUCK LOAD | | 26 | *PAST DUE* |
| | | 0603 | 20 | | TRUCK LOAD | | 7 | *PAST DUE* |
| | | 100138 | | N | TRUCK LOAD | | 19 | *PAST DUE* |
| | | 100154 | | N | TRUCK LOAD | | 23 | *PAST DUE* |
| | | 100242 | | N | TRUCK LOAD | | 19 | *PAST DUE* |
| | | 100281 | | | TRUCK LOAD | | 8 | *PAST DUE* |

FIG. 4

```
                                                      08/22/95  1:18:03 pm
┌ESC=Exit──┤ F1=Help─────────────────────┤ Group     ──┤ Plant     ──────┐
│Trailer Maintenance Screen              │ MATG2       │ OHIO TRUCK      │
  Plant> (OHIO TRUCK)
        Trailer> 223         Carrier> CI
        Shipper#>

Type!Description--------------        Yard!Dock!Description--------------
      !                                     !    !

----!Arrived-!LastMove!Notified!Retained
  Date!08/22/95!  /  /  !  /  /  !  /  /
  Time!13:17   !    :   !    :   !    :

Comment  *                      CARRIER                       ≡
            Ccarrier│Ccarname                                   ▲
           ─────────┼──────────────────────────────────────────
            CHTL    │CHURCHILL
            CIEG    │CIMARRON EXPRESS
            CLCO    │CLEVELAND COURIER EXPEDITING               ▼
            ◄                                                   ►

[ Press F10 to exit ]
```

FIGURE 6A

```
                                                    08/22/95  1:14:16 pm
┌ESC=Exit──┤ F1=Help────────────────────┤ Group  ──┤ Plant ─────────┐
│Trailer Maintenance Screen              │ MATGZ    │ OHIO TRUCK     │
└────────────────────────────────────────┴──────────┴────────────────┘
  Plant> (OHIO TRUCK)
        Trailer> 223302    Carrier> CUIT    (CUSTOMIZED TRANSPORTATI)
        Shipper#>

Type:Description--------------    Yard!Dock!Description--------------
  MT   :EMPTY                        W  !     !YARD, WEST ----!Arrived-!LastMove!Notified!Retained
  Date:08/01/95!08/02/95!  /  / !08/02/95
  Time:09:18   !22:19   !  :    !22:19
 ┌────────────────────────────[ Press F10 to exit ]──────────────────┐
 │ Spot Date        Spot Time     Transaction Transaction Description │
 │ 08/22/95         13:14         MT          EMPTY                   │
 │                                                                    │
 │ Exit to Yard                               Exit to Dock            │
 │                                                                    │
 │ Comment                                                            │
 └────────────────────────────────────────────────────────────────────┘
                                                                    >
```

FIGURE 6B

```
                                            08/22/95  1:09:13 pm
┌ESC=Exit────f F1=Help─────────────────────────────────────────────┐
│ Trailer Maintenance Screen              │ MATG2    │ OHIO TRUCK  │
│                                                                   │
│   Enter Group Id>        2   MATG2                                │
│   Enter Plant Id>       22   OHIO TRUCK                           │
│                                                                   │
│        Trailer Id>                                                │
│        Carrier Id>                                                │
│        Shipper # >                                                │
│        In Yard>           In Dock>          In Type>              │
│                                                                   │
│        Arriving Between >   / /      and   / /                    │
│        Last Moved Between>  / /      and   / /                    │
│                                                                   │
│                                                                   │
│                                                                   │
│                                                                   │
│                                                                   │
└───────────────────────────────────────────────────────────────────┘
```

CARRIER
DOCK ACTIVITY REPORT

```
CARRIERS=LEHM      —711
DOCKS=
Report Covers:12/04/97 @ 00:00:00   thru   12/04/97 @ 23:59:59      —712

Inbound from Yard Activity=       17
Inbound from Dock Activity=        2
Arrive directly to Dock    =       2                                —713
                          ===========
                Total=            21

Outbound to Yard Activity  =      18
Outbound to Dock Activity  =       1
Departed from Dock         =       0
Still in Dock              =       2                                —714
                          ===========
                Total=            21

Outbound from dock as a Partial Load   =       1
Outbound from dock as an Empty Load    =       3
Outbound from dock as a Rack Load      =      14
Outbound from dock as any other Status=        1                    —715
Still in Dock                          =       2
                                      ===========
                              Total=          21

Yard-Dock-Yard Switches    =      15
Yard-Dock-Dock Switches    =       1
Dock-Dock-Dock Switches    =       0                                —716
Dock-Dock-Yard Switches    =       2
```

FIG. 7B

DOCK ACTIVITY REPORT                              Page:    1

720
                         ↓
CARRIERS=LEHM
DOCKS=
Report Covers:12/04/97 @ 00:00:00    thru    12/04/97 @ 23:59:59

DOCK: 59 ┐— 721

722              723              724              725        726
In Dock Time   |Exit Dock Time|Dwell Time (minutes)|Trailer  |Carrier
---------------|--------------|--------------------|---------|--------
12/04/97 01:09|12/04/97 07:00|          351.00|5062          |LEHM
727─┤ Inbound Status =TL      From: Yard=LCL    Dock=
    │ Outbound Status=RO      To:   Yard= R2    Dock=
                                                 ↘728

12/04/97 07:00|12/04/97 08:22|           82.00|5060          |LEHM
     Inbound Status =TL       From: Yard=LCL    Dock=
     Outbound Status=RO       To:   Yard= R2    Dock=

12/04/97 08:22|12/04/97 09:38|           76.00|5076          |LEHM
     Inbound Status =TL       From: Yard= UN    Dock=
     Outbound Status=RO       To:   Yard= R1    Dock=

12/04/97 09:38|12/04/97 11:09|           91.00|5062          |LEHM
     Inbound Status =TL       From: Yard= UN    Dock=
     Outbound Status=RO       To:   Yard= R2    Dock=

12/04/97 11:10|12/04/97 13:17|          127.00|5054          |LEHM
     Inbound Status =TL       From: Yard= UN    Dock=
     Outbound Status=RO       To:   Yard= R1    Dock=

12/04/97 12:59|12/04/97 16:24|          205.00|5062          |LEHM
     Inbound Status =LUT      From: Yard=       Dock=
     Outbound Status=RO       To:   Yard= R3    Dock=

12/04/97 16:25|12/04/97 17:25|           60.00|5060          |LEHM
     Inbound Status =TL       From: Yard= UN    Dock=
     Outbound Status=RO       To:   Yard= R3    Dock=

Dock Activity =    7

FIG. 7C

LIVE UNLOAD REPORT
                    730
                     ↓
CARRIERS=LEHM
DOCKS=
Report Covers:12/04/97 @ 00:00:00   thru   12/04/97 @ 23:59:59

|DOCK:LUD|— 731

732             733            734              735         736
In Dock Time    |Exit Dock Time|Dwell Time (minutes)|Trailer  |Carrier
----------------|--------------|--------------------|---------|--------
12/04/97 16:38|    /  /      |                    0.00|5054    |LEHM
    Inbound Status =LU       From:  Yard=       Dock=
    Outbound Status=         To:    Yard=       Dock=

Dock Activity =      1

FIG. 7D

ARRIVAL COUNT REPORT

Report covers the dates: 11/01/1997 thru 11/30/1997 - 30 day(s)
Report includes the following carriers: ALL 1. Detailed Listing by Hour of Day

| Time | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | Total |
|---|---|---|---|---|---|---|---|---|---|---|---|---|---|---|---|---|---|---|---|---|---|---|---|---|---|
| 11/01/97 (SAT) | 2 | 0 | 0 | 0 | 1 | 0 | 0 | 1 | 0 | 1 | 2 | 0 | 0 | 1 | 0 | 0 | 0 | 0 | 0 | 0 | 0 | 0 | 0 | 0 | 8 |
| 11/02/97 (SUN) | 0 | 0 | 0 | 0 | 0 | 0 | 0 | 1 | 0 | 0 | 0 | 0 | 1 | 0 | 0 | 0 | 0 | 0 | 0 | 0 | 0 | 0 | 0 | 1 | 3 |
| 11/03/97 (MON) | 0 | 1 | 4 | 3 | 4 | 11 | 38 | 7 | 8 | 10 | 10 | 7 | 12 | 14 | 6 | 10 | 12 | 8 | 6 | 10 | 7 | 8 | 8 | 8 | 212 |
| 11/04/97 (TUE) | 7 | 2 | 2 | 1 | 6 | 6 | 8 | 7 | 8 | 7 | 10 | 10 | 14 | 11 | 9 | 8 | 8 | 8 | 9 | 4 | 7 | 9 | 9 | 5 | 175 |
| 11/05/97 (WED) | 6 | 3 | 2 | 0 | 3 | 9 | 12 | 9 | 7 | 16 | 5 | 11 | 16 | 11 | 9 | 9 | 9 | 8 | 7 | 8 | 13 | 5 | 5 | 7 | 190 |
| 11/06/97 (THU) | 4 | 4 | 2 | 1 | 8 | 8 | 9 | 9 | 7 | 11 | 7 | 14 | 8 | 10 | 11 | 5 | 7 | 6 | 11 | 6 | 7 | 6 | 5 | 5 | 171 |
| 11/07/97 (FRI) | 6 | 5 | 3 | 4 | 7 | 13 | 11 | 7 | 8 | 9 | 8 | 16 | 11 | 8 | 4 | 7 | 12 | 8 | 5 | 4 | 8 | 5 | 5 | 4 | 178 |
| 11/08/97 (SAT) | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 11/09/97 (SUN) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 2 | 0 | 2 |
| 11/10/97 (MON) | 0 | 1 | 0 | 0 | 5 | 21 | 36 | 9 | 10 | 8 | 7 | 15 | 10 | 7 | 9 | 10 | 9 | 8 | 10 | 7 | 6 | 9 | 8 | 4 | 209 |
| 11/11/97 (TUE) | 5 | 2 | 1 | 1 | 2 | 14 | 5 | 8 | 5 | 11 | 10 | 7 | 13 | 11 | 8 | 3 | 13 | 5 | 8 | 10 | 5 | 7 | 11 | 5 | 170 |
| 11/12/97 (WED) | 7 | 6 | 0 | 2 | 2 | 18 | 7 | 10 | 7 | 5 | 13 | 9 | 14 | 13 | 9 | 5 | 11 | 6 | 7 | 9 | 7 | 2 | 7 | 12 | 188 |
| 11/13/97 (THU) | 6 | 4 | 3 | 2 | 3 | 14 | 6 | 8 | 5 | 3 | 9 | 7 | 7 | 9 | 4 | 14 | 5 | 12 | 9 | 4 | 8 | 5 | 6 | 3 | 156 |
| 11/14/97 (FRI) | 9 | 2 | 0 | 3 | 1 | 6 | 7 | 7 | 9 | 9 | 10 | 5 | 6 | 9 | 8 | 3 | 7 | 11 | 3 | 5 | 3 | 2 | 5 | 4 | 134 |
| 11/15/97 (SAT) | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 11/16/97 (SUN) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11/17/97 (MON) | 0 | 0 | 0 | 0 | 0 | 0 | 0 | 0 | 10 | 0 | 2 | 1 | 0 | 0 | 3 | 0 | 0 | 0 | 0 | 0 | 0 | 0 | 0 | 0 | 16 |
| 11/18/97 (TUE) | 0 | 0 | 0 | 0 | 0 | 0 | 0 | 1 | 0 | 1 | 2 | 2 | 0 | 3 | 0 | 2 | 0 | 0 | 0 | 0 | 0 | 0 | 0 | 0 | 11 |
| 11/19/97 (WED) | 0 | 0 | 0 | 0 | 0 | 0 | 0 | 4 | 0 | 1 | 0 | 0 | 1 | 0 | 1 | 0 | 0 | 0 | 0 | 0 | 0 | 0 | 0 | 0 | 7 |
| 11/20/97 (THU) | 0 | 0 | 0 | 0 | 0 | 0 | 0 | 0 | 13 | 1 | 1 | 1 | 2 | 5 | 3 | 1 | 0 | 0 | 0 | 0 | 0 | 0 | 0 | 0 | 27 |
| 11/21/97 (FRI) | 0 | 0 | 0 | 0 | 0 | 0 | 0 | 29 | 3 | 3 | 2 | 7 | 3 | 3 | 8 | 1 | 0 | 0 | 0 | 0 | 0 | 0 | 0 | 0 | 59 |
| 11/22/97 (SAT) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11/23/97 (SUN) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 1 |
| 11/24/97 (MON) | 0 | 5 | 0 | 2 | 3 | 12 | 58 | 8 | 5 | 7 | 6 | 9 | 11 | 4 | 12 | 3 | 10 | 11 | 10 | 7 | 11 | 2 | 4 | 5 | 205 |
| 11/25/97 (TUE) | 4 | 1 | 1 | 1 | 7 | 8 | 8 | 7 | 9 | 10 | 7 | 13 | 10 | 9 | 3 | 9 | 8 | 6 | 8 | 7 | 6 | 7 | 9 | 5 | 163 |
| 11/26/97 (WED) | 5 | 0 | 0 | 4 | 6 | 9 | 3 | 12 | 4 | 11 | 6 | 14 | 9 | 11 | 8 | 5 | 8 | 7 | 11 | 6 | 5 | 4 | 2 | 5 | 155 |
| 11/27/97 (THU) | 0 | 0 | 0 | 2 | 1 | 0 | 1 | 0 | 0 | 0 | 1 | 0 | 1 | 0 | 0 | 0 | 0 | 0 | 0 | 0 | 0 | 0 | 0 | 0 | 6 |
| 11/28/97 (FRI) | 0 | 0 | 0 | 0 | 0 | 0 | 1 | 0 | 0 | 0 | 0 | 0 | 0 | 0 | 1 | 0 | 0 | 1 | 0 | 1 | 1 | 2 | 0 | 0 | 7 |
| 11/29/97 (SAT) | 0 | 0 | 0 | 0 | 0 | 1 | 0 | 0 | 0 | 0 | 0 | 0 | 1 | 0 | 1 | 0 | 0 | 0 | 1 | 0 | 1 | 1 | 0 | 0 | 6 |
| 11/30/97 (SUN) | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 1 |
| Total | 63 | 36 | 18 | 26 | 59 | 150 | 244 | 136 | 98 | 125 | 121 | 144 | 153 | 145 | 104 | 93 | 119 | 104 | 105 | 88 | 94 | 73 | 88 | 76 | 2462 |
| Avg: 30 days | 2 | 1 | 1 | 1 | 2 | 5 | 8 | 5 | 3 | 4 | 4 | 5 | 5 | 5 | 3 | 3 | 4 | 3 | 4 | 3 | 3 | 2 | 3 | 3 | |

FIG. 8A

ARRIVAL COUNT REPORT

801

Report covers the dates: 11/01/1997 thru 11/30/1997 - 30 day(s)
Report includes the following carriers: ALL 2. Summary by Day of Week

| Day Of Week | # of Days in date range | Total # of Arrivals | Average # of Arrivals |
|---|---|---|---|
| SUN | 5 | 7 | 1.40 |
| MON | 4 | 642 | 160.50 |
| TUE | 4 | 519 | 129.75 |
| WED | 4 | 540 | 135.00 |
| THU | 4 | 360 | 90.00 |
| FRI | 4 | 378 | 94.50 |
| SAT | 5 | 16 | 3.20 |
| | | 2462 | |

806

3. Summary by Hour of Day, By Day of Week

3A. Total number of Arrivals

| Day of Week | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | Total |
|---|---|---|---|---|---|---|---|---|---|---|---|---|---|---|---|---|---|---|---|---|---|---|---|---|---|
| SUN | 0 | 0 | 0 | 0 | 0 | 0 | 0 | 1 | 0 | 0 | 0 | 0 | 1 | 0 | 0 | 0 | 0 | 0 | 0 | 0 | 0 | 0 | 1 | 4 | 7 |
| MON | 0 | 7 | 4 | 5 | 12 | 44 | 132 | 34 | 23 | 27 | 24 | 31 | 33 | 28 | 27 | 23 | 31 | 27 | 26 | 24 | 24 | 19 | 20 | 17 | 642 |
| TUE | 16 | 5 | 4 | 3 | 15 | 28 | 22 | 22 | 23 | 30 | 29 | 30 | 40 | 31 | 22 | 20 | 29 | 19 | 25 | 21 | 18 | 23 | 29 | 15 | 519 |
| WED | 18 | 9 | 2 | 6 | 11 | 36 | 26 | 31 | 19 | 32 | 24 | 35 | 39 | 36 | 26 | 19 | 28 | 21 | 25 | 23 | 25 | 11 | 14 | 24 | 540 |
| THU | 10 | 8 | 5 | 5 | 12 | 22 | 16 | 30 | 13 | 15 | 17 | 24 | 20 | 23 | 16 | 19 | 12 | 18 | 20 | 10 | 15 | 11 | 11 | 8 | 360 |
| FRI | 15 | 7 | 3 | 7 | 8 | 19 | 48 | 17 | 20 | 20 | 25 | 24 | 20 | 25 | 13 | 11 | 19 | 19 | 9 | 9 | 12 | 8 | 12 | 8 | 378 |
| SAT | 4 | 0 | 0 | 0 | 1 | 1 | 0 | 1 | 0 | 1 | 2 | 0 | 2 | 0 | 1 | 0 | 0 | 0 | 1 | 0 | 1 | 1 | 0 | 16 |
| Total | 63 | 36 | 18 | 26 | 59 | 150 | 244 | 136 | 98 | 125 | 121 | 144 | 153 | 145 | 104 | 93 | 119 | 104 | 105 | 88 | 94 | 73 | 88 | 76 | 2462 |
| Avg: 30 days | 2 | 1 | 1 | 1 | 2 | 5 | 8 | 5 | 3 | 4 | 4 | 5 | 5 | 5 | 3 | 3 | 4 | 3 | 3 | 3 | 2 | 3 | 3 | | |

807

3B. Average number of Arrivals

| Day of Week | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 5 SUNs | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 4 MONs | 0 | 2 | 1 | 1 | 3 | 11 | 33 | 9 | 6 | 7 | 6 | 8 | 8 | 7 | 7 | 6 | 8 | 7 | 7 | 6 | 6 | 5 | 5 | 4 |
| 4 TUEs | 4 | 1 | 1 | 1 | 4 | 7 | 6 | 6 | 6 | 8 | 7 | 8 | 10 | 8 | 6 | 5 | 7 | 5 | 6 | 5 | 5 | 6 | 7 | 4 |
| 4 WEDs | 5 | 2 | 1 | 2 | 3 | 9 | 7 | 8 | 5 | 8 | 6 | 9 | 10 | 9 | 7 | 5 | 7 | 5 | 6 | 6 | 6 | 3 | 4 | 6 |
| 4 THUs | 3 | 2 | 1 | 1 | 3 | 6 | 4 | 8 | 3 | 4 | 4 | 6 | 5 | 6 | 4 | 5 | 3 | 5 | 5 | 3 | 4 | 3 | 3 | 2 |
| 4 FRIs | 4 | 2 | 1 | 2 | 2 | 5 | 12 | 4 | 5 | 5 | 6 | 6 | 5 | 6 | 3 | 3 | 5 | 5 | 2 | 2 | 3 | 2 | 3 | 2 |
| 5 SATs | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

SWITCH COUNT REPORT

Report covers the dates: 11/01/1997 thru 11/30/1997 - 30 day(s)
REPORT ONLY COUNTS INBOUND SWITCHES TO DOCKS-ALL 1. Detailed Listing by Hour of Day

| Time | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | Total |
|---|---|---|---|---|---|---|---|---|---|---|---|---|---|---|---|---|---|---|---|---|---|---|---|---|---|
| 11/01/97 (SAT) | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 11/02/97 (SUN) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11/03/97 (MON) | 0 | 0 | 0 | 0 | 0 | 0 | 7 | 10 | 12 | 13 | 13 | 4 | 12 | 14 | 9 | 0 | 13 | 11 | 10 | 12 | 8 | 6 | 6 | 9 | 169 |
| 11/04/97 (TUE) | 1 | 0 | 0 | 0 | 0 | 2 | 10 | 7 | 10 | 20 | 12 | 4 | 9 | 10 | 1 | 0 | 11 | 13 | 8 | 11 | 10 | 5 | 2 | 8 | 153 |
| 11/05/97 (WED) | 1 | 0 | 0 | 0 | 0 | 0 | 8 | 11 | 13 | 10 | 11 | 1 | 11 | 15 | 2 | 0 | 17 | 13 | 6 | 10 | 10 | 3 | 3 | 4 | 149 |
| 11/06/97 (THU) | 0 | 0 | 0 | 0 | 0 | 0 | 7 | 15 | 8 | 14 | 10 | 5 | 2 | 9 | 9 | 1 | 13 | 15 | 9 | 8 | 9 | 3 | 12 | 0 | 149 |
| 11/07/97 (FRI) | 3 | 0 | 0 | 0 | 0 | 0 | 9 | 11 | 10 | 7 | 11 | 5 | 7 | 4 | 4 | 0 | 7 | 0 | 11 | 16 | 8 | 7 | 10 | 1 | 131 |
| 11/08/97 (SAT) | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 2 |
| 11/09/97 (SUN) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11/10/97 (MON) | 0 | 0 | 0 | 0 | 0 | 1 | 6 | 9 | 8 | 14 | 7 | 7 | 10 | 11 | 4 | 0 | 12 | 10 | 11 | 17 | 5 | 1 | 14 | 4 | 151 |
| 11/11/97 (TUE) | 2 | 0 | 0 | 0 | 0 | 0 | 7 | 16 | 7 | 7 | 8 | 4 | 15 | 7 | 1 | 0 | 20 | 10 | 5 | 12 | 7 | 0 | 7 | 4 | 139 |
| 11/12/97 (WED) | 0 | 0 | 0 | 0 | 0 | 0 | 11 | 13 | 10 | 9 | 14 | 3 | 10 | 7 | 5 | 0 | 15 | 12 | 4 | 15 | 9 | 4 | 5 | 3 | 149 |
| 11/13/97 (THU) | 3 | 0 | 0 | 0 | 0 | 1 | 11 | 14 | 4 | 12 | 10 | 4 | 8 | 5 | 7 | 0 | 15 | 8 | 9 | 14 | 9 | 3 | 7 | 8 | 152 |
| 11/14/97 (FRI) | 1 | 0 | 0 | 0 | 0 | 1 | 8 | 7 | 14 | 4 | 14 | 2 | 8 | 5 | 5 | 1 | 10 | 17 | 6 | 11 | 4 | 3 | 5 | 4 | 130 |
| 11/15/97 (SAT) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11/16/97 (SUN) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11/17/97 (MON) | 0 | 0 | 0 | 0 | 0 | 0 | 0 | 1 | 1 | 0 | 1 | 0 | 0 | 0 | 1 | 0 | 0 | 0 | 0 | 0 | 0 | 0 | 0 | 0 | 4 |
| 11/18/97 (TUE) | 0 | 0 | 0 | 0 | 0 | 0 | 1 | 0 | 2 | 0 | 0 | 0 | 0 | 0 | 0 | 0 | 0 | 0 | 0 | 0 | 0 | 0 | 0 | 0 | 3 |
| 11/19/97 (WED) | 0 | 0 | 0 | 0 | 0 | 0 | 0 | 1 | 0 | 0 | 0 | 0 | 0 | 1 | 0 | 0 | 0 | 0 | 0 | 0 | 0 | 0 | 0 | 0 | 2 |
| 11/20/97 (THU) | 0 | 0 | 0 | 0 | 0 | 0 | 0 | 0 | 5 | 0 | 0 | 2 | 0 | 0 | 5 | 0 | 0 | 0 | 0 | 0 | 0 | 0 | 0 | 0 | 12 |
| 11/21/97 (FRI) | 0 | 0 | 0 | 0 | 0 | 0 | 0 | 0 | 0 | 8 | 0 | 2 | 0 | 0 | 10 | 0 | 0 | 0 | 0 | 0 | 0 | 0 | 0 | 0 | 20 |
| 11/22/97 (SAT) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11/23/97 (SUN) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11/24/97 (MON) | 0 | 0 | 0 | 0 | 0 | 0 | 14 | 8 | 3 | 19 | 7 | 6 | 12 | 9 | 4 | 0 | 17 | 16 | 7 | 12 | 17 | 3 | 8 | 3 | 165 |
| 11/25/97 (TUE) | 4 | 0 | 0 | 0 | 0 | 0 | 8 | 12 | 5 | 14 | 11 | 7 | 12 | 7 | 2 | 0 | 15 | 17 | 11 | 8 | 11 | 6 | 8 | 3 | 161 |
| 11/26/97 (WED) | 1 | 0 | 0 | 0 | 0 | 0 | 7 | 13 | 9 | 7 | 8 | 9 | 7 | 8 | 5 | 0 | 16 | 12 | 8 | 4 | 13 | 5 | 4 | 1 | 137 |
| 11/27/97 (THU) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11/28/97 (FRI) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11/29/97 (SAT) | 1 | 0 | 0 | 0 | 0 | 0 | 0 | 0 | 0 | 0 | 2 | 2 | 1 | 0 | 0 | 0 | 0 | 0 | 0 | 0 | 0 | 0 | 0 | 0 | 5 |
| 11/30/97 (SUN) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Total | 19 | 0 | 0 | 0 | 0 | 5 | 114 | 147 | 122 | 158 | 139 | 67 | 124 | 111 | 75 | 2 | 181 | 154 | 105 | 150 | 120 | 49 | 90 | 52 | 1984 |
| Avg: 30 days | 1 | 0 | 0 | 0 | 0 | 0 | 4 | 5 | 4 | 5 | 5 | 2 | 4 | 4 | 3 | 0 | 6 | 5 | 4 | 5 | 4 | 2 | 3 | 2 | |

FIG. 9A

SWITCH COUNT REPORT

Report covers the dates: 11/01/1997 thru 11/30/1997 - 30 day(s)   901
REPORT ONLY COUNTS INBOUND SWITCHES TO DOCKS=ALL 2. Summary by Day of Week

| Day Of Week | # of Days in date range | Total # of Switches | Average # of Switches |
|---|---|---|---|
| SUN | 5 | 0 | 0 |
| MON | 4 | 489 | 122 |
| TUE | 4 | 456 | 114 |
| WED | 4 | 437 | 109 |
| THU | 4 | 313 | 78 |
| FRI | 4 | 281 | 70 |
| SAT | 5 | 8 | 2 |
| | | 1984 | |

3. Summary by Hour of Day, By Day of Week

3A. Total number of Switches

| Day of Week | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | Total |
|---|---|---|---|---|---|---|---|---|---|---|---|---|---|---|---|---|---|---|---|---|---|---|---|---|---|
| SUN | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| MON | 0 | 0 | 0 | 0 | 0 | 1 | 27 | 28 | 24 | 46 | 28 | 17 | 34 | 34 | 18 | 0 | 42 | 37 | 28 | 41 | 30 | 10 | 28 | 16 | 489 |
| TUE | 7 | 0 | 0 | 0 | 0 | 2 | 26 | 35 | 24 | 41 | 31 | 15 | 36 | 24 | 4 | 0 | 46 | 40 | 24 | 31 | 28 | 11 | 16 | 15 | 456 |
| WED | 2 | 0 | 0 | 0 | 0 | 0 | 26 | 37 | 33 | 26 | 33 | 28 | 30 | 13 | 0 | 48 | 37 | 18 | 29 | 32 | 12 | 12 | 8 | | 437 |
| THU | 3 | 0 | 0 | 0 | 0 | 1 | 18 | 29 | 17 | 26 | 20 | 11 | 10 | 14 | 21 | 1 | 28 | 23 | 18 | 22 | 18 | 6 | 19 | 8 | 313 |
| FRI | 4 | 0 | 0 | 0 | 0 | 1 | 17 | 18 | 24 | 19 | 25 | 9 | 15 | 9 | 19 | 1 | 17 | 17 | 17 | 27 | 12 | 10 | 15 | 5 | 281 |
| SAT | 3 | 0 | 0 | 0 | 0 | 0 | 0 | 0 | 0 | 0 | 2 | 2 | 1 | 0 | 0 | 0 | 0 | 0 | 0 | 0 | 0 | 0 | 0 | 0 | 8 |
| Total | 19 | 0 | 0 | 0 | 0 | 5 | 114 | 147 | 122 | 158 | 139 | 67 | 124 | 111 | 75 | 2 | 181 | 154 | 105 | 150 | 120 | 49 | 90 | 52 | 1984 |
| Avg: 30 days | 1 | 0 | 0 | 0 | 0 | 0 | 4 | 5 | 4 | 5 | 5 | 2 | 4 | 4 | 3 | 0 | 6 | 5 | 4 | 5 | 4 | 2 | 3 | 2 | |

3B. Average number of Switches

| Day of Week | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 5 SUNs | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 MONs | 0 | 0 | 0 | 0 | 0 | 0 | 7 | 7 | 6 | 12 | 7 | 4 | 9 | 9 | 5 | 0 | 11 | 9 | 7 | 10 | 8 | 3 | 7 | 4 |
| 4 TUEs | 2 | 0 | 0 | 0 | 0 | 1 | 7 | 9 | 6 | 10 | 8 | 4 | 9 | 6 | 1 | 0 | 12 | 10 | 6 | 8 | 7 | 3 | 4 | 4 |
| 4 WEDs | 1 | 0 | 0 | 0 | 0 | 0 | 7 | 9 | 8 | 7 | 8 | 3 | 7 | 8 | 3 | 0 | 12 | 9 | 5 | 7 | 8 | 3 | 3 | 2 |
| 4 THUs | 1 | 0 | 0 | 0 | 0 | 0 | 5 | 7 | 4 | 7 | 5 | 3 | 3 | 4 | 5 | 0 | 7 | 6 | 5 | 6 | 5 | 2 | 5 | 2 |
| 4 FRIs | 1 | 0 | 0 | 0 | 0 | 0 | 4 | 5 | 6 | 5 | 6 | 2 | 4 | 2 | 5 | 0 | 4 | 4 | 4 | 7 | 3 | 3 | 4 | 1 |
| 5 SATs | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 9B

1001    LIVE UNLOAD EXCEPTION REPORT

Report covers the dates: 12/04/97 thru 12/04/97
Include data from Archives: No
Report sorted by Carrier/Trailer #
CARRIERS=LEHM Total number of LU arrivals    : 2
Number of LU exceptions        : 5
Total number of exception spots: 5   1005          1006  1007           1008
 1002    1003      1004
Carrier |Trailer |Arrived        |First Move      |Moves|Departed       |Status|
========|========|===============|================|=====|===============|======|
LEHM    |5014    |12/03/97 @ 22:32|12/04/97 @ 00:34|    1|12/04/97 @ 01:25|RO    |
LEHM    |5052    |12/03/97 @ 23:52|12/04/97 @ 06:37|    1|12/04/97 @ 10:09|RO    |
LEHM    |5054    |12/03/97 @ 23:17|12/04/97 @ 01:09|    1|12/04/97 @ 03:17|RO    |
LEHM    |5060    |12/03/97 @ 20:51|12/03/97 @ 22:20|    1|12/04/97 @ 03:23|RO    |
LEHM    |5062    |12/04/97 @ 12:59|12/04/97 @ 16:24|    1|12/04/97 @ 17:03|RO    |

FIG. 10A

Live Unload Exception Report                                                          Page    2
                                                                    1010

Carrier      : LEHM     (LEHMAN CARTAGE / ZONE)
Trailer      : 5014     (HISTORY) (Headerid=169017)
Status       : RO   (RACKS OUTBOUND)
Live Unload  : Yes                                            ├─1011
    Exception: Yes
Location     : Yard= R3   Dock=

----|Arrived-|LastMove|ImmedFax|Retained|Unload  |PL Racks|Reload  |Departed
Date|12/03/97|12/04/97|  /  /  |12/04/97|12/04/97|12/04/97|12/04/97|12/04/97  ├─1012
Time|22:32:14|00:34:55|        |00:34   |00:34   |00:34   |00:34   |01:25:11

Date    |Time    |Yard|Dock|Type |AD|Comment
--------|--------|----|----|-----|--|------------------------------------
12/03/97|22:32:14|    | 60 |LUT  |A |
12/04/97|00:34:55| R3 |    |RO   |  |                                         ├─1013
12/04/97|01:25:11| R3 |    |RO   |D |

FIG. 10B

```
                              Slot Availability Report              1101
                              ------------------------
                         1103                 SLOTS                  ↙
  1102 |       |   |   |   |    |1|1|1|1|1|1|1|1|1|1|2|2|2|2|2|2|2|2|2|2|3|3|3|3|3|3|3|3|3|3|4
       YARD |1|2|3|4|5|6|7|8|9|0|1|2|3|4|5|6|7|8|9|0|1|2|3|4|5|6|7|8|9|0|1|2|3|4|5|6|7|8|9|0
       -----|-|-|-|-|-|-|-|-|-|-|-|-|-|-|-|-|-|-|-|-|-|-|-|-|-|-|-|-|-|-|-|-|-|-|-|-|-|-|-|-
       East |*|*|*|*|*| |*| | |*|*|*|*| | | | | | | | | | | | | | | | | | | | | | | | | | | |
       West | | |*|*|*|*|*|*|*|*|*|■| | |*|*|*|*| | | | |*|*|*|*|*|*| | | | | | | | | | | | |
       North| | | | | | | | | | | | | | | | | | | | | | | | | | | | | | | | | | | | | | | | |
       South|*| |*| | | | |*| | | |*| | | | |*|*|*|*|*|*|*|*|*|*|*|*|*|*| | | | | | | | | | |
            | | | | | | | | | | | | | | | | | | | | | | | | | | | | | | | | | | | | | | | | |
            | | | | | | | | | | | | | | | | | | | | | | | | | | | | | | | | | | | | | | | | |
            | | | | | | | | | | | | | | | | | | | | | | | | | | | | | | | | | | | | | | | | |
            | | | | | | | | | | | | | | | | | | | | | | | | | | | | | | | | | | | | | | | | |

⌐Selected Slot:  Yard=West   Row=3   Slot=12    Carrier=HJBT     Trailer=53242     Status=MT
  | F5: Find a Trailer by Trailer Number       F6: Find a Trailer by Status Code
  | F8: Zoom in to the selected Yard           Enter: View History of selected Trailer
  \ESC: Escape
   \
    \___1104
```

FIG. 11A

```
           Slot Availability Report
             Yard Selection Screen      1106
         ─────────────────────────────
           1107            1108
```

| Yard ID | Yard Name |
|---------|-----------|
| BB | Butler Bld |
| East | East Yard |
| North | North Yard |
| NPS | New Paint Shop |
| South | South Yard |
| West | West Yard |

Enter: Display Row Selection Screen
↑↓: Scroll Up or Down
PageUp/PageDown: Full Page Up or Down
F5: Find Trailer by Trailer Number
F6: Find a Trailer by Status Code
ESC: Finished

FIG. 11B

Slot Availability Report
Row Selection Screen
--------------------------------

Selected Yard: NPS (New Paint Shop Yard)     1110

1111

| Row ID |
|--------|
| 1 |
| 2 |
| 3 |
| 4 |
| 5 |
| Overflow |

Enter: Display Slot Detail Screen
↑↓: Scroll Up or Down
PageUp/PageDown: Full Page Up or Down
F5: Find Trailer by Trailer Number
F6: Find a Trailer by Status Code
ESC: Return to Yard Selection Screen

FIG. 11C

Slot Availability Report
Slot Detail Screen
-----------------------------

Selected Yard: NPS (New Paint Shop Yard)
Selected Row: 4

1114     1112

| Yard Switchers |
|---|
| BDF - Bob Foster |
| JST - Julius Tucker |
| KKS - Karen Sims |

| 1: CETR-24565<br>BDF (MT) | 2: | 3: | 4: |
| 5: OJTP-88182<br>JST (TL) | 6: | 7: | 8: |
| 9: | 10: PSCR-780?<br>BDF (RO) | 11: | 12: |
| 13: | 14: | 15: | 16: |
| 17: | 18: HJBT-32<br>KKS (TL) | 19: | 20: |

1113

Enter: View History of selected Trailer
↑ ↓: Scroll Up or Down                          ← →: Scroll Left or Right
PageUp/PageDown: Full Page Up or Down
F5: Find a Trailer by Trailer Number
F6: Find a Trailer by Status Code
ESC: return to Row Selection Screen

FIG. 11D

```
                            Slot Availability Report
                         Find Trailer By Trailer Number
                         ------------------------------
     1116

Enter Trailer Number: 32

Enter: Display Location and Status Information for selected Trailer
ESC: Finished
```

FIG. 11E

```
                          Slot Availability Report
                       Find Trailer By Trailer Number
                          Trailer Quick Summary Screen
                       ----------------------------------

Trailer: 32     Carrier: HJBT              1118

Status:         TL                              ⎤
         Yard:           NPS (New Paint Shop Yard)       ⎥
         Row:            4                               ⎬—1120
         Slot:           18                              ⎥
         Switcher ID:    KKS                             ⎦

Do you want to view the Slot Detail Screen (Yes/No)?: Yes

ESC: Return to Yard Selection Screen
```

FIG. 11F

CONTAINER AND INVENTORY MONITORING METHODS AND SYSTEMS

RELATED APPLICATIONS

This patent application is related to U.S. patent application Ser. No. 08/519,888, filed Aug. 28, 1995, issued as U.S. Pat. No. 5,712,789.

FIELD OF THE INVENTION

The present invention pertains generally to logistics methods and systems for tracking and control of containers, shipping racks and inventory. More particularly, the invention pertains to methods and systems which create and maintain an accurate record of the location and movement of containers, racks and inventory within the boundaries and between sites such as factories, assembly plants, warehouses, shipping yards and freight switching facilities.

BACKGROUND OF THE INVENTION

In the related application, a method and system is described for monitoring the location and load status of containers within the boundaries of a manufacturing or shipping or warehouse facility. The invention eliminates the substantial cost of locating containers within sprawling shipping container receiving yards, so that the container can be readily brought to an assigned dock for unloading. The present application focuses even more closely on the movement and load status of containers in transit and within yards and production facilities such as automobile factories, and describes unobvious enhancements and additions to the container monitoring methods and systems which yield even more accurate and detailed information on the location and status of containers, shipping racks, and running inventories. The described enhancements reduce waste and inefficiency in the common shipping process from a supplier (such as a manufacturer of parts), a carrier (such as a trucking or shipping or freight forwarding company), a warehouse, and an end customer who assembles parts together to make a complete product.

Tracking of containers in transit is well developed, including the use of satellites and other electronic technology to obtain real-time data on in transit locations. Inventory accounting and management is also a well developed filed in which the contents of very large warehouses are ascertainable to high level of detail at any point in time. Areas which lack total control over the status and accounting of goods and the conveyances needed to move the goods are in yards in which containers are received at a facility, and in the facilities. Without information on the location and load status of containers at a facility, or an accounting for a number of parts (especially small parts) within a facility, a manufacturer or supplier or carrier has no way of calculating a current, real-time accounting of assets.

For example, in a typical sale and shipment of goods transaction, a carrier may know from a satellite tracking system that a container has reached a factory, but does not know if the container has been emptied, partially emptied, reloaded, or the contents of a reload such as racks. The carrier's "asset" in the shipping transaction is a bill of lading which he presents to the factory upon completion of the delivery. But the bill of lading cannot be paid upon until the delivery is complete. Thus the carrier must have information on the load status of the container at the factory. A supplier's asset is the account receivable for the goods delivered to the factory. Payment of the supplier's invoice may be conditioned upon not only delivery of the goods, but actual assembly of the goods into a finished product, known as "paid-on-production". The supplier's assets may also include be considered to include any racks which must be returned to the supplier so that a subsequent shipment of goods can be made. In some cases the supplier may in fact own the racks and is therefore further interested in having them returned. If the supplier does not learn of an incorrect return shipment of racks until a carrier arrives at the supplier's facility, the supplier (and possibly the customer) have incurred a loss. The customer's asset is of course the ordered goods such as parts. To reduce or eliminate the cost of holding parts prior to assembly, the customer wants to receive the goods ideally not until the time at which they are needed for assembly. To coordinate this, the customer must have information on the transport of the goods to the factory by the carrier. While just-in-time delivery of parts is a good concept which can be applied to some manufacturing operations, it is not practical for all production. Therefore, the customer inevitably ends up holding some parts on the premises and is in effect functioning as a warehouse. In order to minimize the cost of this holding or warehousing, the customer must know which goods have arrived in which containers, and where the containers are located.

Another critical area which is not addressed at all by most logistics systems is that of racks which support product within a container. In many respects, these racks, their location, expected time of arrival on return, and condition, are just as critical and valuable as the products they carry. For without racks, many products cannot be shipped. There is thus a need to track shipping racks, particularly on the return trip to suppliers, as closely as the shipment of product.

The prior art has also overlooked the logistical management of relatively small parts such as fasteners or electronic components. Small parts are typically delivered in containers of progressively smaller size, from pallet to carton to box. Holding a quantity of small parts greater than is immediately required leads to losses within an assembly facility. Thus a system is needed to track the deliver of small parts containers and to monitor the running inventory in comparison to completed production.

SUMMARY OF THE INVENTION

The present invention provides methods and systems for improved logistical controls over shipping container tracking, switch monitoring and load status, and real-time total inventory accounting. In accordance with a fundamental aspect of the invention, a container monitoring system is provided for accumulating and storing information on shipping containers, including location and load status. The system includes a receiving area for receiving containers to be monitored by the system, the receiving area within a defined boundary within which container are to be monitored by the system, a container entry point at the boundary at which containers are identified by pre-existing identification codes which are recorded at the container entry point, a switching vehicle for moving containers to and from a receiving area and to and from a facility within the boundary according to instructions received from the facility, and means for recording information on location and load status of containers within the defined boundary, including information on receiving area identification, and identification of containers in designated slots within a receiving area.

The invention further provides computer means for generating reports on container arrivals at a facility, numbers of moves of a container by a switching vehicle within a receiving area, and locations and unloading activities of containers at docks at a facility.

The invention also provides a system for monitoring and locating containers within a monitored network of container shipping terminals and destination facilities. The system enables a carrier to identify the terminal or facility within a network at which a particular container is located, to know where within a terminal or facility a container is located, and to know the load status of a container within a terminal of facility.

The invention also provides a virtual inventory tracking system which generates real-time data on product shipments within containers in transit, at a facility, and within a facility.

The invention also provides a method and system for creating electronic and paper records of shipping rack return activity from reloading of racks into a container to completed return of racks to a supplier.

And, the invention also provides a metered warehousing and delivery system for production driven delivery and control of small sized inventory.

These and other aspects of the invention are herein described in particularized detail with reference to the accompanying Figures, the Figures being representative of but some of the various ways in which the principles and concepts of the invention may be carried out.

BRIEF DESCRIPTION OF THE FIGURES

In the accompanying Figures:

FIG. 3 is an example of a container status report generated by the container monitor and control system of the present invention;

FIG. 4 is an example of an Empty Trailer Report listing only trailor containors which are completely empty and ready for departure from the premises.

FIGS. 6A–6C are representative screen displays generated by a computer program which performs certain functions of the container monitor and control system of the present invention;

FIGS. 7A–7D are examples of screen displays and dock activity reports generated by a computer program which performs certain functions of the container monitor and control system of the present invention;

FIGS. 8A–8B are examples of screen displays and summary reports of container arrivals at a facility generated by a computer program which performs certain functions of the container monitor and control system of the present invention;

FIGS. 9A–9B are examples of screen displays and summary reports of container switching activity at a facility generated by a computer program which performs certain functions of the container monitor and control system of the present invention;

FIGS. 10A–10B are examples of screen displays and live unload exception reports on container unloading activity at a facility generated by a computer program which performs certain functions of the container monitor and control system of the present invention;

FIGS. 11A–11F are examples of screen displays and reports on container locations, identities, and load status within parking slots within container receiving yards, generated by a computer program which performs certain functions of the container monitor and control system of the present invention;

DETAILED DESCRIPTION OF PREFERRED AND ALTERNATE EMBODIMENTS

Figure 1:
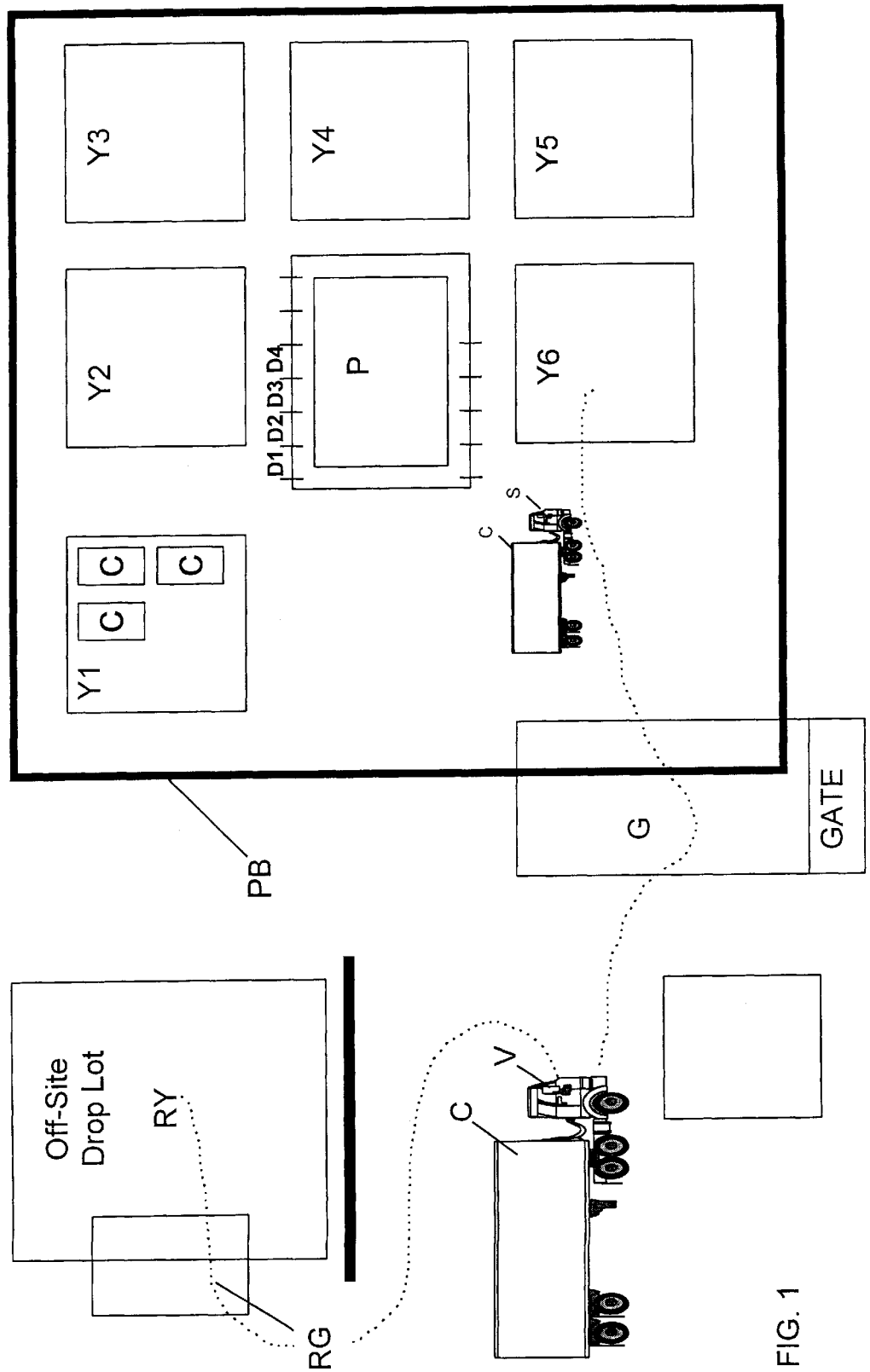
FIG. 1 is a schematic diagram of the basic operational components of one embodiment of the container monitor and control system (CMCS) of the present invention.

FIG. 1 schematically illustrates one application of a basic aspect of the container and inventory monitoring system of the invention, within the confines of a facility boundary B. A facility F may be a factory, warehouse sub-assembly plant, freight transfer station, distribution center, or any other place where shipping containers are loaded or unloaded. The facility boundary B is the area which surrounds or is associated with the facility F. As used herein, the term "system" refers to the described equipment, hardware and software used to carry out the described methods of container and inventory monitoring, and to the apparatus and equipment used to operate the system, including computer hardware and software, peripheral data input devices, monitors, communications devices and transportation vehicles, shipping containers and shipping racks. In the basic system shown in FIG. 1, the system accumulates, stores and disseminates information on containers C with respect to the location of containers relative to facility boundary B locations within the facility boundaries but outside the facility referred to as the receiving areas or yards Y, and docks D which are designated entrances or doors to a facility F. Entry to and exit from the facility boundary B is directed through and controlled by gate G. As further described herein, important time sensitive data on containers and container loads which the system uses is collected at entry points to a facility boundary B such as gate G.

As further shown in FIG. 1, each receiving area Y is assigned a unique designator such as Y1, Y2, etc. Each of the docks are uniquely designated such as D1, D2, etc. Movers of shipping containers, and each shipping container is also uniquely identified by a code or number. For example, in the trucking industry, each of the vehicles of carriers or shipping companies which move containers are uniquely identified by, for example, an alpha "SCAT" code which may correspond to the name of the shipping company. Each of the containers are assigned an individual code (usually numeric) which is combined with the SCAT code to identify every carrier/container combination. This combination of codes is used to track containers and monitor carrier performance.

The system is readily adaptable to other modes of shipping such as inter-modal ship/rail/truck containers, air freight containers, tankers, waste haulers, or any other type of shipping container. With coded identification of all carriers and containers, control over facility boundaries, and means for recording status and location of containers within a facility boundary, the system has the basic framework for compiling detailed data on the shipping process which can be used by the facility, suppliers and carriers to optimize logistics.

The system monitors and records all container movements and locations within the facility boundaries B. For example, when a container C is delivered by a carrier vehicle V to a facility through gate G, its arrival date and time is loaded into the system and it is located within a receiving area or yard Y by motive means S. The location of the container within the yard Y is also recorded, as is the number of times the container has been moved since its arrival at the facility boundary B. This data is transferred or made available to the computer system of the facility as further described below. The movement of a container within the facility boundary B or yard Y is referred to herein as a "switch". It is also generally referred to in the shipping industry as a "spot" or "drop".

Figure 2:
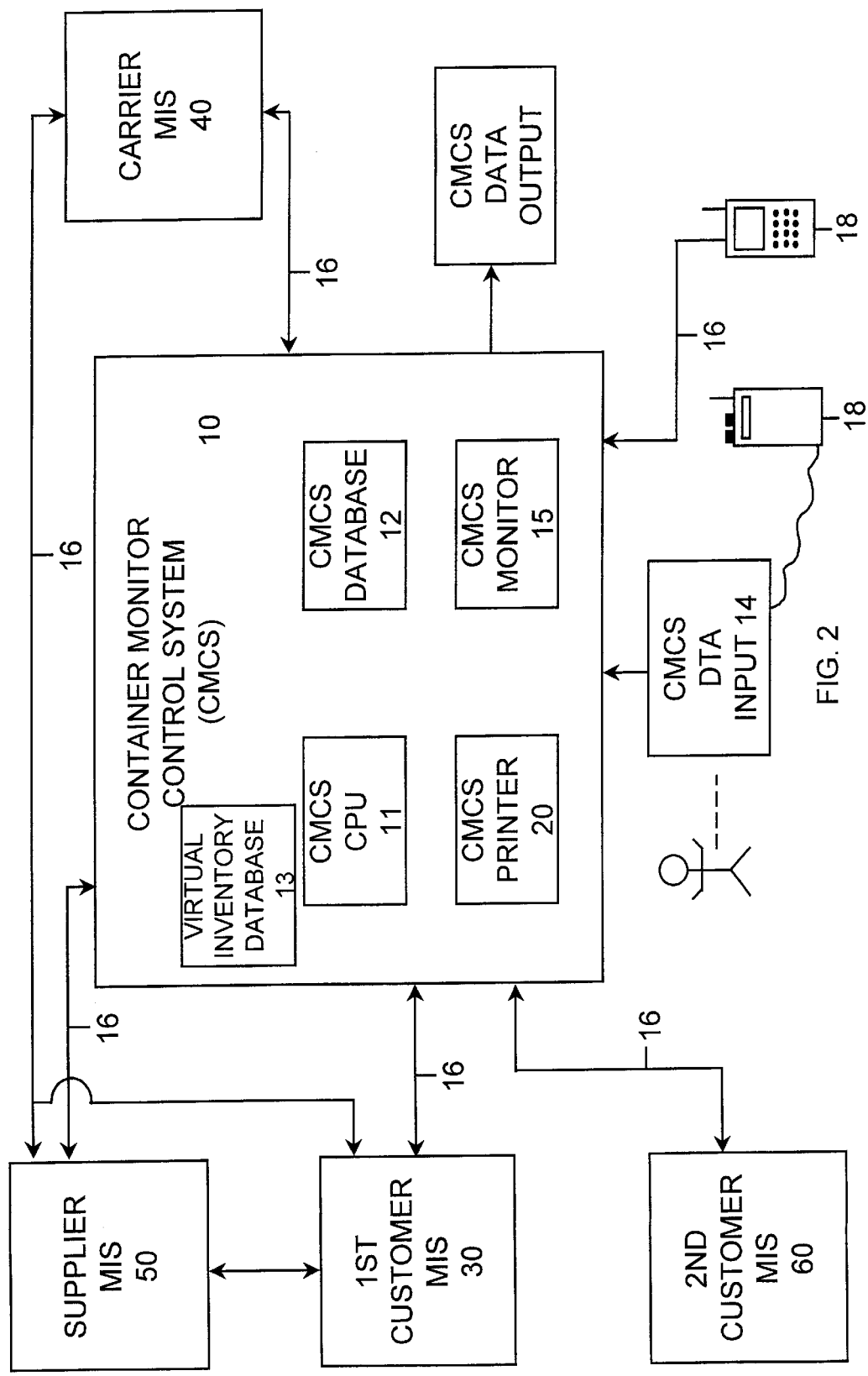
FIG. 2 is a schematic diagram of the basic hardware components of the Container Monitor Control System (CMCS) of the present invention including related databases, management information systems and input and communications devices.

FIG. 2 schematically illustrates an integrated system in which the computer system of the container and inventory monitoring system is combined with a computer system of a facility F. A container monitor and control system (CMCS) 10 includes a central processing unit 11 for receiving and processing container-related data, a container monitoring system database 12, a virtual inventory database 13, one or more container data input terminals 14 which may be locally or remotely located from the CMCS 10, a CMCS monitor 15, communications links 16 to remote computing systems and/or data receiving modules such as EDI, facsimile or e-mail or Internet connections, remote container data transceivers 18, and one or more printers 20 for producing hard copy reports of container data acquired and processed by the CMCS 10. In one possible hardware arrangement of the system 10, one or more container data input terminals 14 and monitors 15 may be located at a gate or gates G for input of data acquired from incoming and outgoing containers into the CMCS 10. Many different types of data input devices can be used in connection with the system to input data on carriers and containers. A human operator located at gate G can input the data as carrier/containers arrive. Other input methods and devices include hand held radios operated by drivers of the switching vehicles S to communicate data to an operator; RFID tag and reader technology, ultrasonic detectors, optical scanners or RF data communications devices such as manufactured by Texas Instruments and Teklogix, or bar code readers such s the Telxon PTC 921 and PTC 912DS. The switching vehicles S are preferably equipped with remote terminal reception and display devices which allow data input, data reception and real-time display on container locations and switching or movement instructions.

The CMCS 10 is interoperable with other computing systems such as for example a management information system (MIS) of a facility to which containers are delivered (referred to herein as the "1st customer MIS 30" or "customer MIS"), and/or an end or intermediate customer (referred to herein as the "2d customer MIS 60"), and/or an MIS of a container carrier business (herein "carrier MIS 40"). As used herein, the term "customer" refers to a recipient of goods from a supplier, as delivered by a carrier. The customer may be a warehouse, freight forwarder, subassembler, final assembler or seller of the goods delivered.

As further shown in FIG. 2, in a preferred embodiment of the invention the CMCS 10 is commonly linked with a plant or customer MIS 30 and container carrier MIS 40 for cross exchange of container and inventory data. Of course, connections could also be made to additional MISs and/or databases to further expand the accessibility of container data compiled by the CMCS 10. An MIS typically includes a set of computerized data collection, analysis and reporting tools which support business decision processes, including a database accessible by a computer programmed with data analysis and reporting software to generate informational reports.

A typical container monitoring sequence is now described with reference to the physical arrangement of FIG. 1 and the monitoring hardware and software described above with reference to FIG. 2. As a container C (pulled by a carrier vehicle V) approaches gate G of facility F, the carrier and container identifying indicia on the vehicle (for example a SCAT code) which is input to the CMCS along with a corresponding container number which appears on the exterior of the container, along with the time of arrival. The recorded time of arrival of a container starts a retention time clock to accurately measure the total amount of time a container is retained on the premises of the destination facility such as facility F. This information is critical to both carriers and customers. Container retention times recorded by the system clearly identify for carriers containers which are held for excessive amounts of time. Customers, i.e., the ultimate recipients of the container contents, who must pay carriers for excess retention time of containers can use the information provided by the system to independently verify charges from carriers for excess retention.

In a preferred method of the invention, the carrier/container combination of data for each arriving container has been transmitted between the carrier MIS 40, supplier MIS 50, and the customer MIS 30, in the form of an advance shipping notice (ASN) prior to the arrival of the container, so that as the carrier and container are identified and input to the CMCS upon arrival at facility F, and this information transmitted from the CMCS to the customer MIS and/or carrier MIS, the system performs the function of communicating confirmation that a particular container has actually arrived at a destination. Once such confirmation is provided, the system continues to monitor the container about and within the premises of facility F.

Bill of lading information may also be transmitted from the carrier MIS to the customer MIS concerning each container, so that confirmation of arrival of the container (by identifying the carrier and container number only) is sufficient to enable to customer MIS to specifically identify, for example, parts which have arrived on the premises and thus available for assembly. Although it is not necessary for the container monitoring system to know the specific contents of any particular container (as represented by an accompanying bill of lading), it is information which can be readily input to the CMCS (either by the carrier MIS, customer MIS, or through CMCS input terminal 14) to enable confirmation of delivery of specific contents-identified containers. In other words, data of the contents of any container can be stored and associated with carrier/container identifications within the CMCS as an alternative or addition to the data contents of the customer or supplier MIS.

Shipping rates and cumulative charges associated with bills of lading may also be entered in the CMCS. This data may be correlated with an independent accounts payable program (for example resident in a customer MIS) whereby payments from a customer to a carrier can be authorized by the data from the CMCS. By this method, payments to carriers are made only for containers/goods which have actually been received or unloaded on the customer's premises. Similarly, carriers can use the delivery confirmation data provided by the system to generate bills to customers with actual confirmation that a particular delivery has been made.

As alternatives to monitoring location and status of specific contents of containers (which is contemplated by the invention), one method of the invention is to monitor the load status of any given container by using designations such as "full" or "truck load", "partial load" or "empty". Load designation conventions can be used such as labeling all incoming containers as "full" in the CMCS (regardless of whether a container is actually full) and all outgoing containers "empty", based upon indications from the customer who is responsible for unloading the container. "Partial loads" are also identified based upon information from the customer that a particular container, only partially unloaded, is to be removed from a dock and returned at a later time. Without the designation of such a container as a "partial load", the customer would have no efficient way of re-locating the container when the remainder of the parts are needed, or of monitoring that the container still had parts in it and should not be allowed to leave the premises until empty. All such load status data is input to the CMCS in the manners described for transmission, by facsimile, electronic mail or through an Internet or world wide web to the customer MIS and carrier MIS. Carriers are thus immediately notified when containers are empty and available for pick-up.

Also monitored by the system is cumulative load data for all incoming and outgoing containers for any particular premises or facility. By tabulating total number of container loads, the system keeps running figures on shipment volume within a premises. This data is then compared to known capacity values to evaluate and/or forecast facility utilization. One example of applicability of this aspect of the invention is to a land fill facility wherein containers are monitored by loads to continuously calculate remaining capacity of a land fill.

Associated with load status and container contents is data on part-carrying racks which fit inside containers. In certain applications of the system, monitoring of racks is equally or even more important than monitoring containers for the reason that certain parts cannot be carried in containers without specially adapted racks. For example, parts such as automobile engines cannot be shipped without empty racks being returned from an automobile assembly plant to an engine plant. Containers which hold such racks are therefore specially identified in the CMCS so that as such containers are completely unloaded, and empty racks placed back in the container, the container is specially identified as, for example, "racks outbound".

A container vehicle V or switcher S drops the container C in a receiving area Y outside or within facility boundaries B. The location of the initial drop off point is confirmed by communication from a remote container data transceiver 18 operated by personnel on the facility premises, such as a shunter driver, for immediate input to the CMCS. This begins the pattern of constant and immediate updating of container location and status by the CMCS to the customer MIS which enables the customer MIS to locate shipments without any searching or delay. The customer provides instructions on which containers are needed at which docks, i.e., switching instructions. Switching instructions may be generated by the customer MIS and delivered to operators of the switchers S or transmitted to the CMCS for communication to switchers S via remote data transceivers 18. Switching instructions are carried out by operators of switchers S which, in the example of a trucking operation, hook-up to a container such as a trailer and move it from a receiving area to the specified dock. The terms "container" and "trailer" are used synonymously herein. The new location of the container is again reported to the CMCS in the form of a dock or gate number for updating of data on that container in the CMCS database. The amount of time the container remains at the dock is counted in the running retention time clock.

Subsequent container switching instructions received from the facility, for example to remove a container from a dock and return it to a yard, are similarly conveyed and executed by switchers S and reported for updating the CMCS database. The data of course includes the location of the container. Load status of a container is also updated according to information provided by the customer. For example, a container which is partially unloaded and then instructed to be returned to a receiving or holding area is noted in the system as a "partial load". The container is thus readily identifiable when instructed to be returned to continue unloading. In the instance where a single container is switched between a yard and dock or docks multiple times before leaving the premises, the system records each switching operation. This information is useful to the customer to identify excessive switching which indicates production or distribution process inefficiency. Because the system continuously tracks the location and status of all containers on the premises at all times, calculations can be made to determine available capacity for receiving additional containers. This includes calculations for one time deliveries such as to land fills.

Once a container is completely empty and returned to a yard, it is recorded in the CMCS database and reported to the carrier as empty and ready for departure from the premises. In order to communicate all of the data acquired by the CMCS relative to container location and status, including arrival and retention times and load status, the system is able to generate reports of container activity in any desired format for the benefit of all customers and all carriers delivering containers to customers. For example, as represented by FIG. 3, a "Detail on Hand" report 100 may be generated by the CMCS in any particular format such as columns and rows in which carriers and containers are listed with accompanying status data such as date and time of arrival, yard location and load status. In column I are listed carrier identifications such as SCAT codes for trucks. Column 2 identifies each carrier by full or abbreviated name. Column 3 lists the date of arrival of each container, and in column 4 is listed the time of arrival. In column 5 is listed the dock or docks at which a container is or was last unloaded. And in column 6 the current yard location of each container is listed. In column 7 is noted the status of the container load, which may include notations empty racks such as "racks outbound". Column 8 lists the container number which corresponds to the carrier. And column 9 is provided for entry of load-specific data such as contents identification and quantities and any other load data as may be included on, for example, a master packing list. The load specific data is critical to customers who pay suppliers on a "paid-on-production" system whereby suppliers are paid only upon assembly of parts into a finished product. By knowing that a certain shipment of parts actually arrived at the plant, and that the container left the plant in an empty state, the system provides the customer with independent verification for authorization of payments to suppliers. The load specific data may further include data on racks in containers. Since a load of racks will have a freight bill identifying the number and type of racks and destination, all of this information can be readily input to the CMCS, and set forth in column 9 of the report, to expedite the return of empty racks to a parts production facility.

The report of FIG. 3 is organized by carrier over a period of calendar days. Other report formats which the system may generate may be according to certain yards or receiving areas, times of arrival, unloading docks, container numbers for certain carriers, or load status. For example, report 120 as depicted in FIG. 4, is compiled as an "Empty Trailer Report" listing only trailer containers which are completely empty and ready for departure from the premises. This type of report is most valuable to carriers wanting to retrieve containers from the customer's premises as soon as possible. The report is also valuable to the customer for verifying over-retention charges by carriers. In this format, the carrier and containers are identified in column 1, the unloading dock in column 2, the current yard location in column 3, and the initial load type in column 4. A "packing list" column 5 is provided for entry of specific data on the contents of a container as described above. The figures in column 6 represent a total amount of time a container has been on the premises from the time of arrival to the time the report was generated. And column 7 is provided as a flag field for time measurements in column 6 which indicate containers "past due" for pick up.

Figure 5:
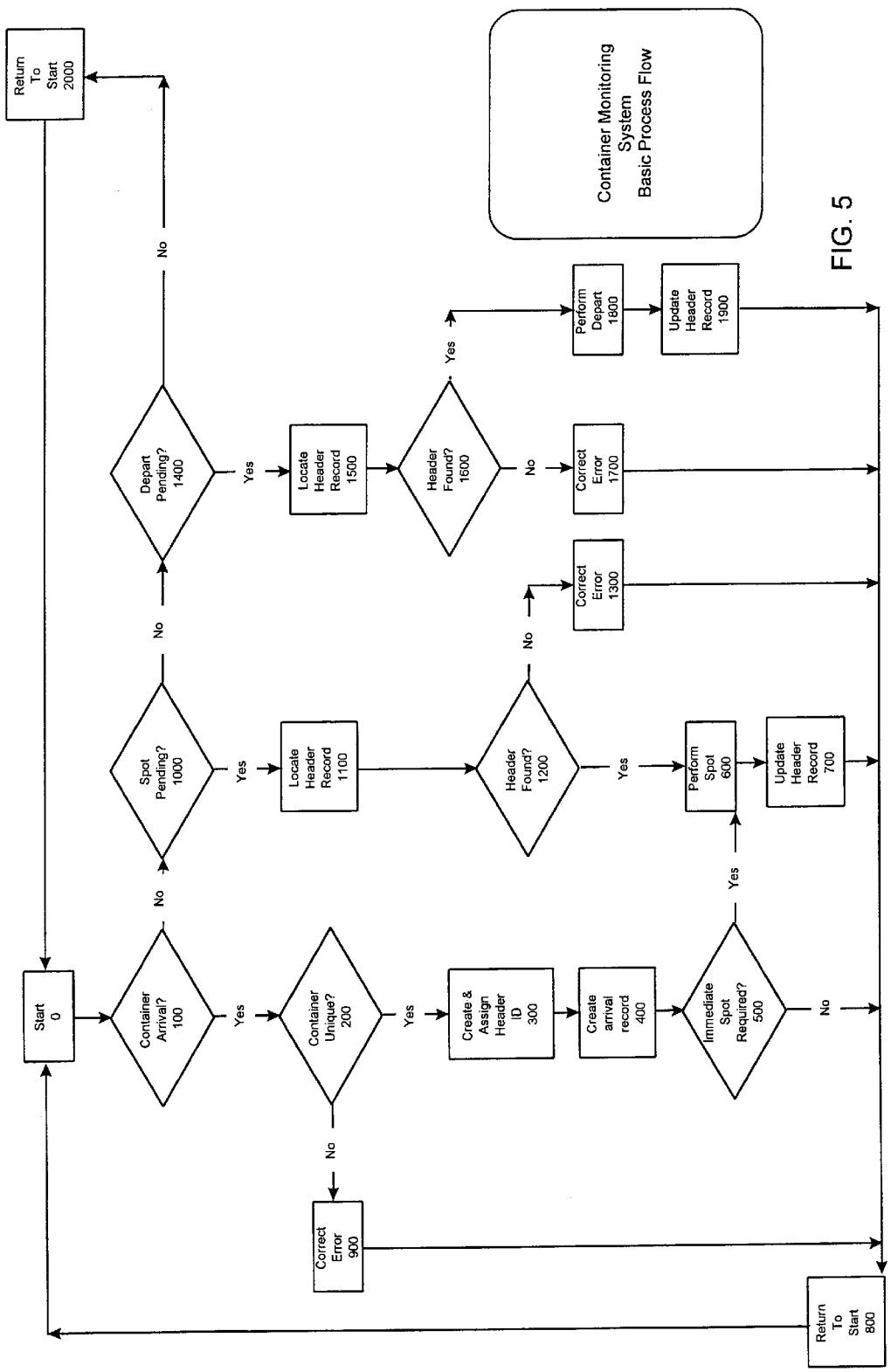
FIG. 5 is flow diagram of certain processing steps of the container monitor and control system of the present invention.

FIG. 5 schematically illustrates one processing flow for monitoring containers in accordance with the invention, which steps may preferably be performed by an appropriately programmed computer such as the CMCS. The computer program generates screen displays for presentation on a connected monitor to an operator of the system. The screen displays provide graphical or spread sheet type formats for entry and verification of container data, and control menus for accessing different types of information on containers in the system.

The process begins at step 0, proceeding to step 100 to determine arrival of a container. Step 200 insures that each arriving container is uniquely identified by the system. FIGS. 6A–6C are representative of types of screen displays which may be generated by the CMCS computer program for input and display of container information at a CMCS monitor. For example, a screen display such as FIG. 6A provides a format for a container identification header to be created at step 300. The header is used as a virtual data envelope by and through which all data relevant to an identified container is accessible, transferable, manipulable. An arrival record is created at step 400. Step 500 is provided to accommodate containers which must be immediately "spotted" or moved to yard or dock, for example based upon information received from the customer MIS identifying "hot" loads. In lieu of an immediate spot, arriving containers are spotted to a yard at step 600 and the header record updated at step 700 with yard location, which may also include a subdesignation of a parking spot within a yard. FIG. 6B is a trailer spot update input screen display. At step 1000, loaded containers are summoned to a receiving dock, based upon instructions received from the customer, the header record for the summoned container located at step 1100 such as by inputting container identification via the input screen display of FIG. 6C, with intermediate error correction steps 1200 and 1300, and a container spot or transfer performed and similarly updated to the system at steps 600 and 700. Containers departing from the premises are monitored at step 1400 which again requires locating the corresponding header record at step 1500 via screen display of FIG. 6C, with error correction for no data match at steps 1600 and 1700, the departure of containers input and updated to the system at steps 1800 and 1900. By performing these steps in connection with the CMCS programmed to follow and prompt users through the sequence, and by controlling the plant entry points and premises, the system maintains accurate records of identification, location and load status of all containers on the premises and the amount of time containers are on the premises.

Figure 7A:
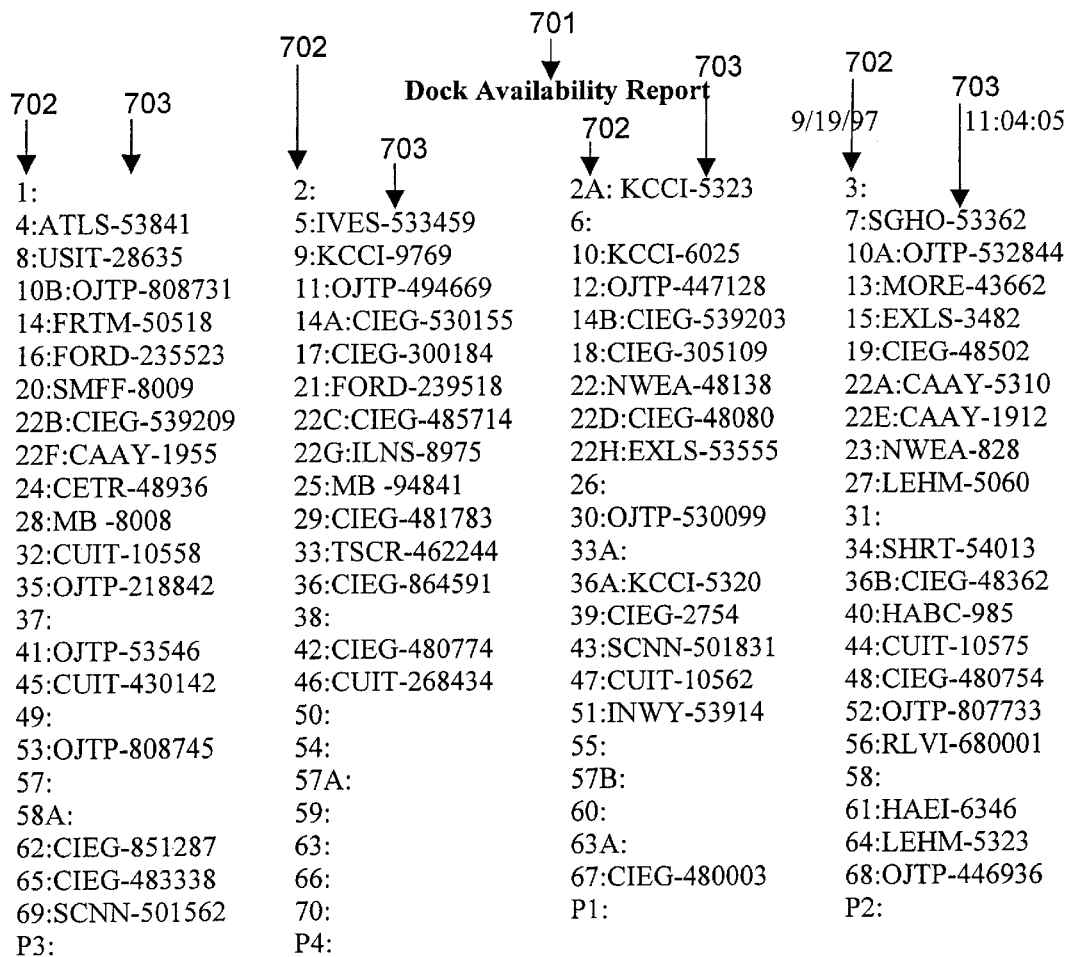

The invention further provides detailed information on dock usage and availability for a given facility. This information is very valuable to managers of the facility to enable analysis of dock usage, and to schedule incoming loads, particularly "hot" loads or live unloads which proceed from a gate directly to a dock for just-in-time delivery, or to coordinate deliveries to arrive within a scheduled window of time. Dock usage directly correlates to production or warehousing activity within a facility, because each dock is located nearest to an assigned task within the facility. When a particular dock is occupied by a container, it is critical to know which is the next nearest available dock. As shown in FIG. 7A, the system produces a real-time Dock Availability Report 701 which numerically lists each dock at a facility in columns 702, followed by carrier and container identification codes in columns 703. The Report 701 is generated from the data received from drivers or the switching vehicles S on containers dropped at a dock. The report 701 can be displayed within a switching vehicle on radio frequency operated hand held devices or on the display of an on-board computer.

By recording every container drop or move to every dock, the system can further generate various Dock Management Reports as shown in FIGS. 7B–7C. FIG. 7B is a Carrier Dock Activity Report 710 which, for a given carrier, such as "LEHM" in field 711 on a given day, such as "12/04/97" in field 712, shows the total number of containers brought to a dock in field 713 and from where they came (e.g., from a yard, from another dock, or direct arrival); total number of containers removed from or left at docks in field 714, the load status of containers removed from docks in field 715. The load status may be partial, empty, empty racks or other such as a "live unload". The total number of different types or switches or movements of containers for the day are recorded in field 716.

As shown in FIG. 7C, the system further generates a specific dock activity report 720 for a particular dock and a particular carrier. The specific dock is identified in field 721. An "In Dock Time" field 722 records the date and time of arrival of a container at the dock. An "Exit Dock Time" field 723 records the date and time of departure of the container from the dock. A "Dwell Time" field 724 records the total time in minutes that the container was at the dock. A "Trailer" field 725 records the identification number of the container, which in this example is a trailer. And a "Carrier" field 726 identifies the carrier. Field 727 records the inbound and outbound load status. Field 728 records the identity of the origination and destination yards.

The dock activity report can assist the facility management by appropriate allocations of manpower to docks for unloading and loading operations.

FIG. 7D is a "live unload" report 730 which records all trailers which were taken directly to docks for unloading upon arrival at a facility. The live unload dock is identified in field 731. The "In Dock Time" is recorded in field 732, the "Exit Dock Time" in field 733, the "Dwell Time" in field 734, the "Trailer" or container identifier in field 735, and "Carrier" identification in field 736. Report 730 assists the facility management in measuring the performance of carriers and logistics providers, as "live unloads" represent the most efficient delivery scenario in which the cargo arrives at a point or window in time in which it can be accepted directly into the facility.

From the report 720, a carrier knows exactly when its containers reached a dock and how long each container remained at a dock for unloading, and whether it was completely or partially unloaded. This information is used to compile a bill to the facility owner for over-retention of containers, in excess of an agreed amount of time allotted for unloading. The facility owner uses this report to confirm that bills for over-retention charges are accurate. The facility owner can also use this report to identify inefficiencies in unloading operations or inaccurate timing of just-in-time manufacturing operations. For example, if a particular dock or group of docks are more active than others, or occupied for longer times than others, it may indicate that more workers are needed at those docks to expedite unloading. The daily generation of reports 710 and 720 can be automatically faxed by the system to both carriers and facility management so that appropriate logistics adjustments can be made. Alternatively, both carriers and a facility may access reports from the CMCS by appropriate connection, including via e-mail or the Internet, as described in connection with FIG. 2.

For managers of a facility where thousands of containers are arriving and departing each month, it is advantageous to have data on trends in container arrival. This information is used to identify delivery windows, or to alter delivery logistics. It is especially useful for timing just-in-time deliveries. FIGS. 8A and 8B together are an example of an Arrival Count Report 801 which shows container arrivals by hour for each day of a month. The days of the month are listed in column 802. The hours for each day are listed in the columns 803 to the right of column 802. Total container arrivals are set forth on line 804, and the average number of container arrivals per hour on line 805. On FIG. 8B, field 806 sets forth total and average numbers of container arrivals for each day of the week for a specified month. Field 807 sets forth the total number of arrivals per hour, per day of each week for a specified month. And field 808 sets forth in summary form the average number of arrivals per hour, per day of each week for a specified month.

The system also records total number of switches per hour per day, as shown by the "Switch Count Report" 901 in FIG. 9A. Column 902 lists the days of a specified month. Columns 903 are for each hour of the day, with totals in the far right column 904. The system operator can use this information to plan for staffing of switching vehicle operators, and to detail billing based on per switch or spot operations. In the "Switch Count Summary Reports", FIG. 9B, the system total number of switches per day of the week for a selected month in field 905, and average number of switches per day of the week for a selected month in field 906. The total number of switches per hour per day of the week is set forth in field 907, and the average number of switches per day per hour of the week in field 908.

The system also generates a "Live Unload Exception" report 1001, shown in FIG. 10A. Because the system knows from an advanced shipping notice (ASN) that a particular load is intended to be a "live unload", which means that the container is to be delivered directly to a dock without being first switched or placed in a yard or holding area, any contact with such a container by a switcher S of the system automatically records the container status as a "live unload exception". The carrier is identified in field 1002. The container is identified in field 1003. The date and time of arrival is identified in field 1004. The date and time of the "First Move", the time the switcher S contacted the container which triggered its entry into the Live Unload Exception report, is recorded in field 1005. The number of moves are recorded in field 1006. This could be several moves before the container is emptied. The date and time of departure is recorded in field 1007. And the load status is recorded in field 1008.

For any container which appears on the Live Unload Exception report 1001, a Detail Page report 1010, shown in FIG. 10B is accessible. Field 1011 includes the carrier and container identifier, load status, the fact that it was originally intended to be a live load but resulted in a live unload exception, and the yard location. Field 1012 records the date and time of each of the events in connection with the excepted container, including the date and time of arrival, last move, immediate fax for notification to the carrier or container owner, retained or put into detention, unload, loading or partial loading of racks (commencement of loading), completed reload and departure. Field 1013 provides a running history of container activity including a record of the date, time, yard, dock, type (of load), arrival/departure (A/D).

Just as the information on dock availability is valuable, so is information on utilization of the various yards surrounding a facility. To this end, the system provides a "Slot Availability" reports as shown in FIGS. 11A–11F which provide real-time information on container identification within each (parking) slot in each yard monitored. FIG. 11A is one graphic form of a yard slot availability report 1101, wherein various yards are identified in the left side column 1102, and yard slots across the upper line 1103. This creates a matrix in which a container location can be identified graphically, by for example the asterisk symbol. The corresponding detailed information on the selected container is displayed below in line 1104, including the yard name, row and slot designation, carrier and container identification code, and load status.

Alternatively, as shown in FIG. 11B, a "Yard Selection Screen" 1106 lists yard identifiers in column 1107, and the yard names in column 1108. Selection of a yard identifier from column 1107 takes the user to a "Row Selection Screen" 1110 shown in FIG. 11C. Selection of a row from column 1111 on screen 1110 takes the user to the "Slot Detail Screen" 1112 shown in FIG. 11D. Within a frame 1113 are designators 1114 for each of the slots (e.g., 1–20) within the selected row. Next to each of the slot designators 1114 are the carrier/container identifiers for the containers present in those slots. This procedure is most useful where the general location of a container is known. When the location of container is to known at all, a search function is provided on each of the screens 1106, 1110 and 1112. not example, by pressing F5, the user is taken to a "Find Trailer By Trailer Number" screen 1116 shown in FIG. 11E. A trailer number is entered and the system switches to a "Trailer Quick Summary Screen" 1118 shown in FIG. 11F. Field 1120 of screen 1118 displays the load status of the container, the yard location, the row designation within the yard, the slot number within the row, and an identifier (e.g., KKS) of a driver of a switching vehicle which placed the container in that location. The identification of the switching vehicle driver is particularly advantageous to operators of the system, to be able to dispatch the correct driver to retrieve a container within the driver's assigned yards or rows. The "Trailer Quick Summary Screen" 1118 can also be accessed by selecting a highlighted trailer/container identifier on the "Slot Detail Screen" 1112 of FIG. 11D. A user can move about the "Slot Detail Screen" 1112 by the use of cursor keys or a mouse.

Containers are commonly tracked in transit by satellites or other electronic signaling and tracking devices. In transit type tracking systems are macro in the sense that they know whether a container is at point A or at point B, or at a location between points A and B, but they do not know the location or load status of a container within point A or point B. Such information is critical to carriers to be able to time deliveries to coordinate with production, to know immediate availability of containers, to know the contents of returning containers such as "racks outbound", and to have enough information to compile a real-time/running accounting of a shipping business as further described below.

The use of radio frequency identification (RFID) tags and readers, as produced for example by SAM$^{SYS}$, Inc., enables rapid acquisition and updating of container location and status. The equipment typically includes a card or tag on which is encoded carrier and container identification data. Tag or card readers are located at facility boundaries such as gate G, or in yards or at docks to automatically identify containers. This instantaneously loads the container location data into the CMCS 10 (FIG. 2). Automated container data input can alternatively be accomplished by the use of magnetically encoded cards and readers, or scannable bar code tags.

Figure 12B:
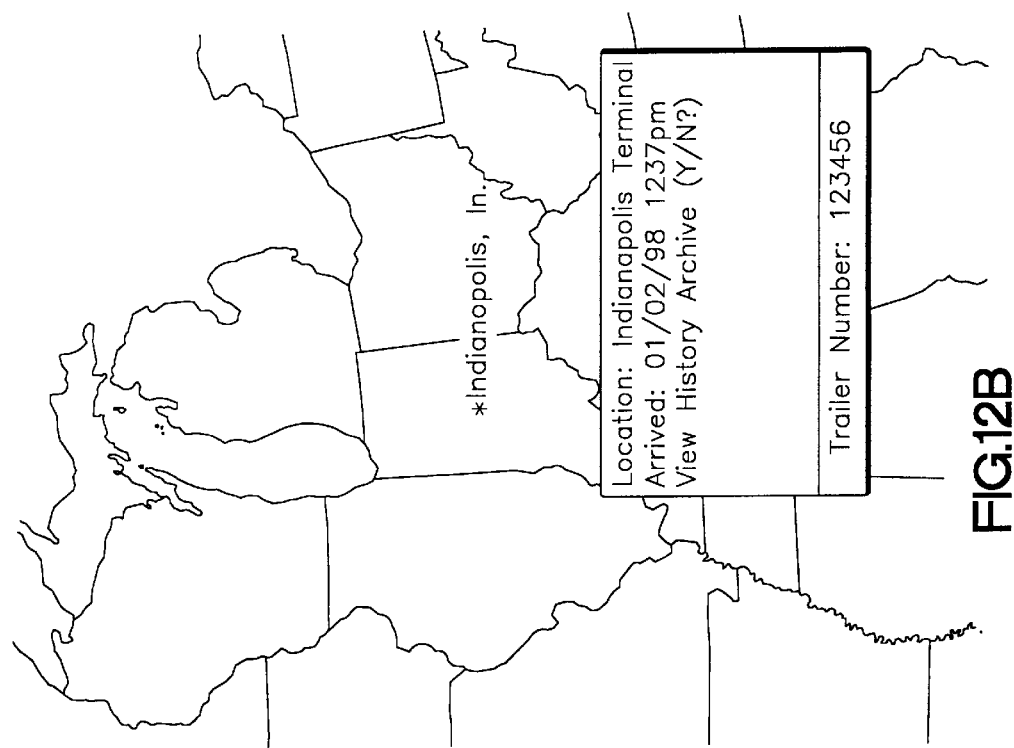
FIGS. 12A–12D are examples of screen displays and reports pertaining to container locations at terminal within a monitored network of facilities or terminals, generated by a computer program which performs certain functions of the container monitor and control system of the present invention.
Figure 12A:
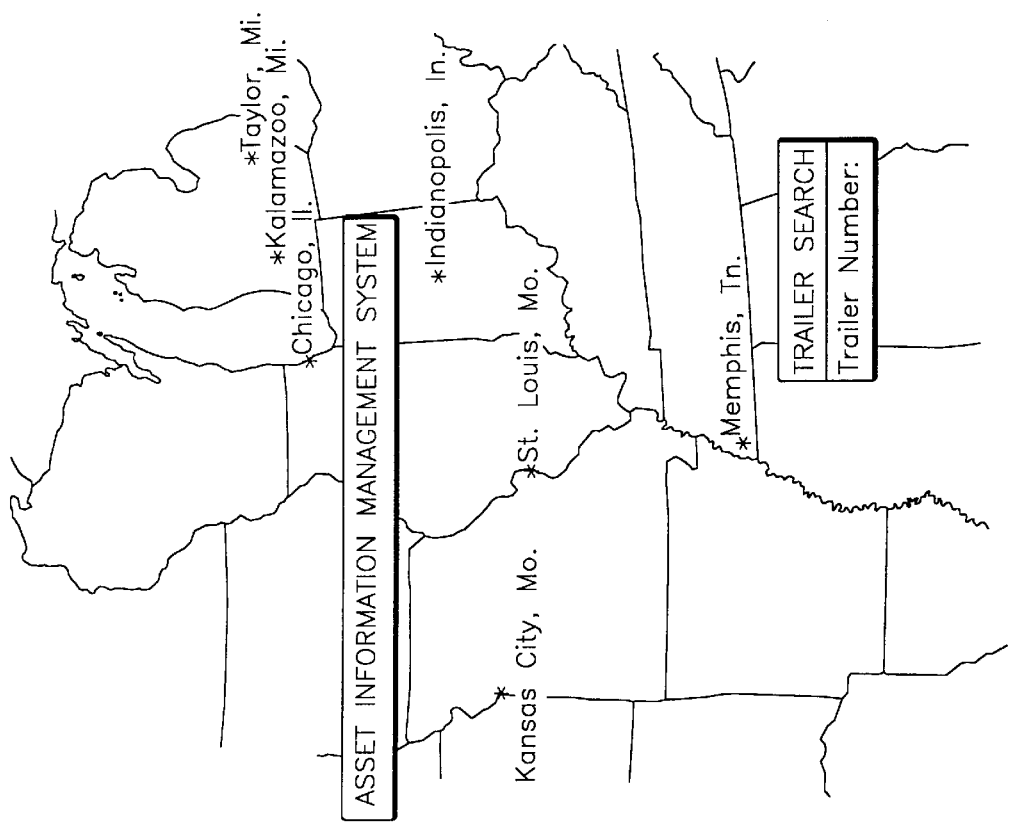

When the tag or card readers of a group or network of facilities are all electronically linked to the CMCS 10, a carrier MIS 40 which is linked to the CMCS can obtain a real-time location of every container which has been automatically read into the system. For example, a carrier or supplier connects to the CMCS by private or other connection such as through the World Wide Web. The user enters an ID number to gain access to the system. In one embodiment, the system generates a mapping screen 1200, shown in FIG. 12A, which displays a geographic territory which encompasses all or some of the carrier's terminals, and facilities at which containers are monitored. Field 1201 of screen 1200 is a container search input to locate a container at any one of the monitored sites. Once a container number is input, the system progresses to display the site at which the input container is presently located, such as screen 1205 shown in FIG. 12B, and in field 1206 displays the site location name, arrival date and time, and a request to view a history archive file, which may be displayed such as field 1013 of FIG. 10B. In other words, it provides an archival history of the specified container at the specified site, i.e., when it arrived, how many switch moves have been made, how many and which docks it has been at, and the load status between each switch move and the current load status.

Figure 12D:
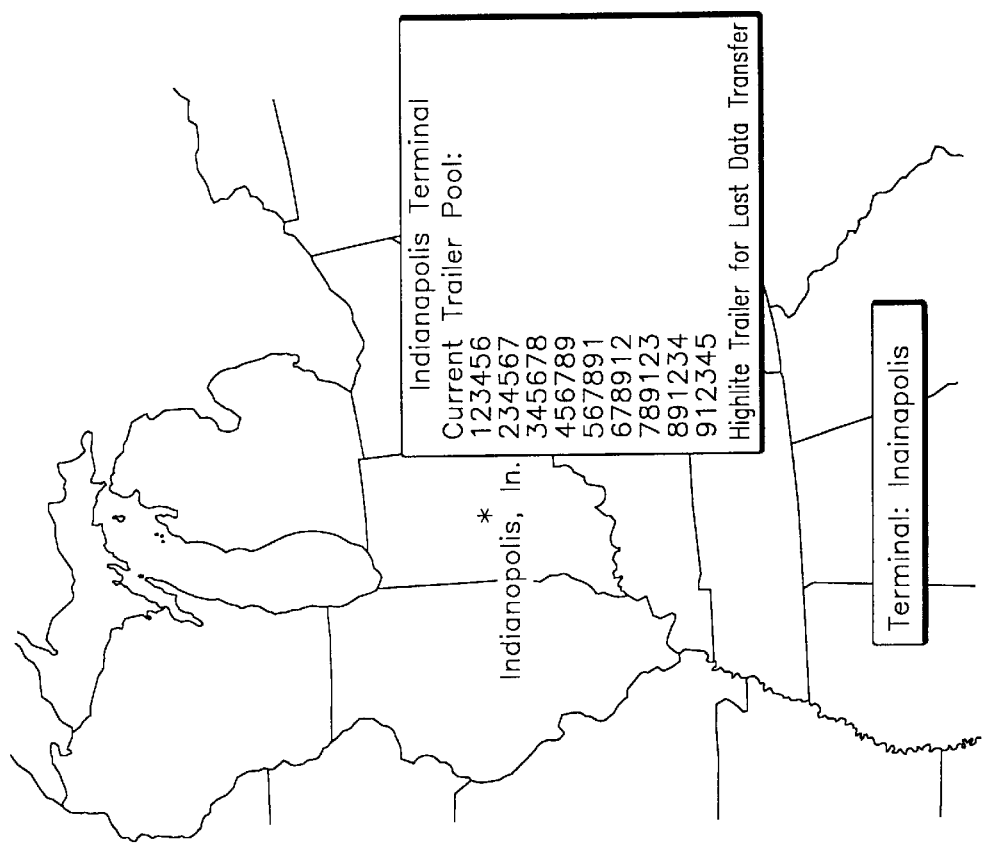
Figure 12C:
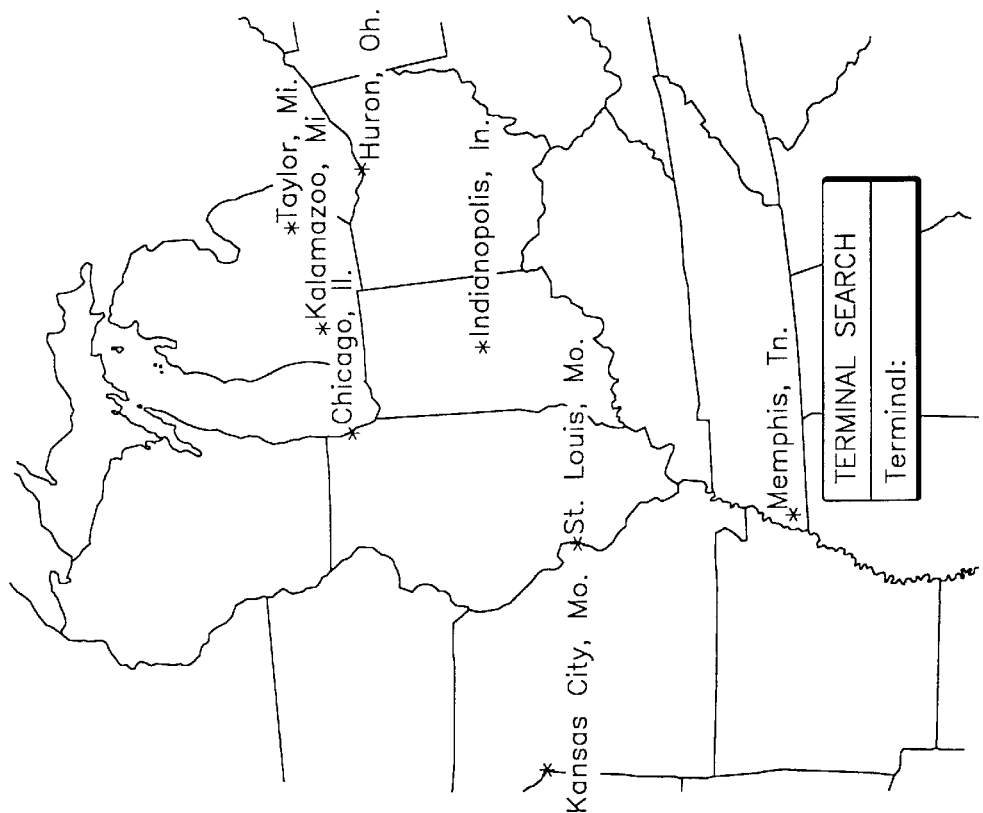

The system uses a similar approach to perform container audits of selected facility or terminal sites. For example, as shown in FIG. 12C, a site display screen 1208 geographically displays each of the facility and/or terminal sites monitored by the system, and includes a site or terminal search field 1209. When the name of site is entered, the system progresses to screen 1210 shown in FIG. 12D, which displays in field 1212 a listing of all containers present at the selected site. A particular container can be selected from field 1212 for detailed archival data on that container in a form, for example, such as field 1013 of FIG. 10B. One item information which may be included in this field for any particular container is a note or comment on the maintenance status of a container. Since the switching vehicle operators and loaders/unloaders of the container have ample opportunity to inspect each container handled, they can input any observed damage or maintenance requirement into a comment field in the container status. This enables a rolling maintenance program whereby a carrier can plan for delivery of a container to a maintenance facility based upon a known repair need. Of course, the container and site data can be alternatively displayed in different formats which may not include a graphical representation.

Figure 13A:
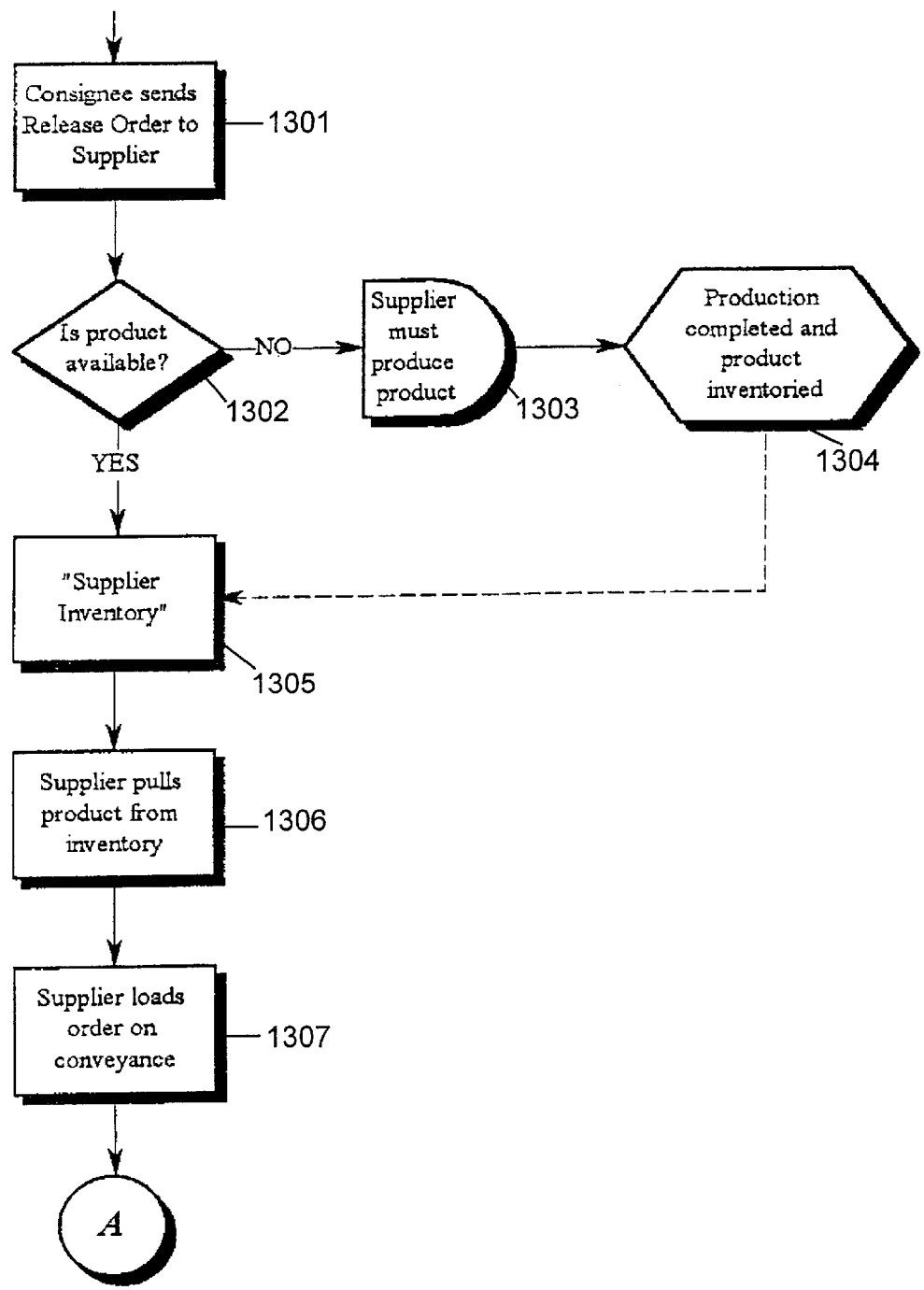
FIGS. 13A–13D are flow diagrams of a virtual inventory tracking process of the present invention.

With the described real-time data on container location and load status acquired by the system, a user such as a carrier or supplier has enough information to derive a virtual inventory at each stage of a supply chain. As described with reference to FIGS. 13A–13D, the supply chain logistics tracking starts with a customer or consignee release of a product/part order at step 1301 in FIG. 13A. The supplier makes an internal check of inventory at step 1302, and goes to production steps 1303 and 1304 if production is required in order to establish supplier inventory at step 1305. A "Supplier" as identified in the boxes, may be either the original manufacturer of the goods specified in the release order at step 1301 or a distributor who physically receives goods from a manufacturer or represents a manufacturer as a sales agent and processes orders for the manufacturer. The supplier pulls product from inventory at step 1306 and loads it on a conveyance at step 1307.

An important piece of inherent data is created at this point with respect to shipping racks. As known in the industry, the term "racks" refers to any type of packaging or support device which holds a part or multiple parts for secure shipment within a container. A rack may be something as simple as a carton, box or pallet, or a complex steel structure which supports an engine or other subassembly of a product. In most instances, products cannot be shipped without a specific corresponding rack.

The type and number of parts loaded for conveyance will indicate the type and number of racks required to be on the shipping container. Similarly, the number of parts can be calculated from part size, pallet size, box or carton size, whether the pallets, boxes, cartons are stackable, and the size of the container in which the parts are being carried. All such data may be resident in the CMCS database 12 (FIG. 2).

Figure 13B:
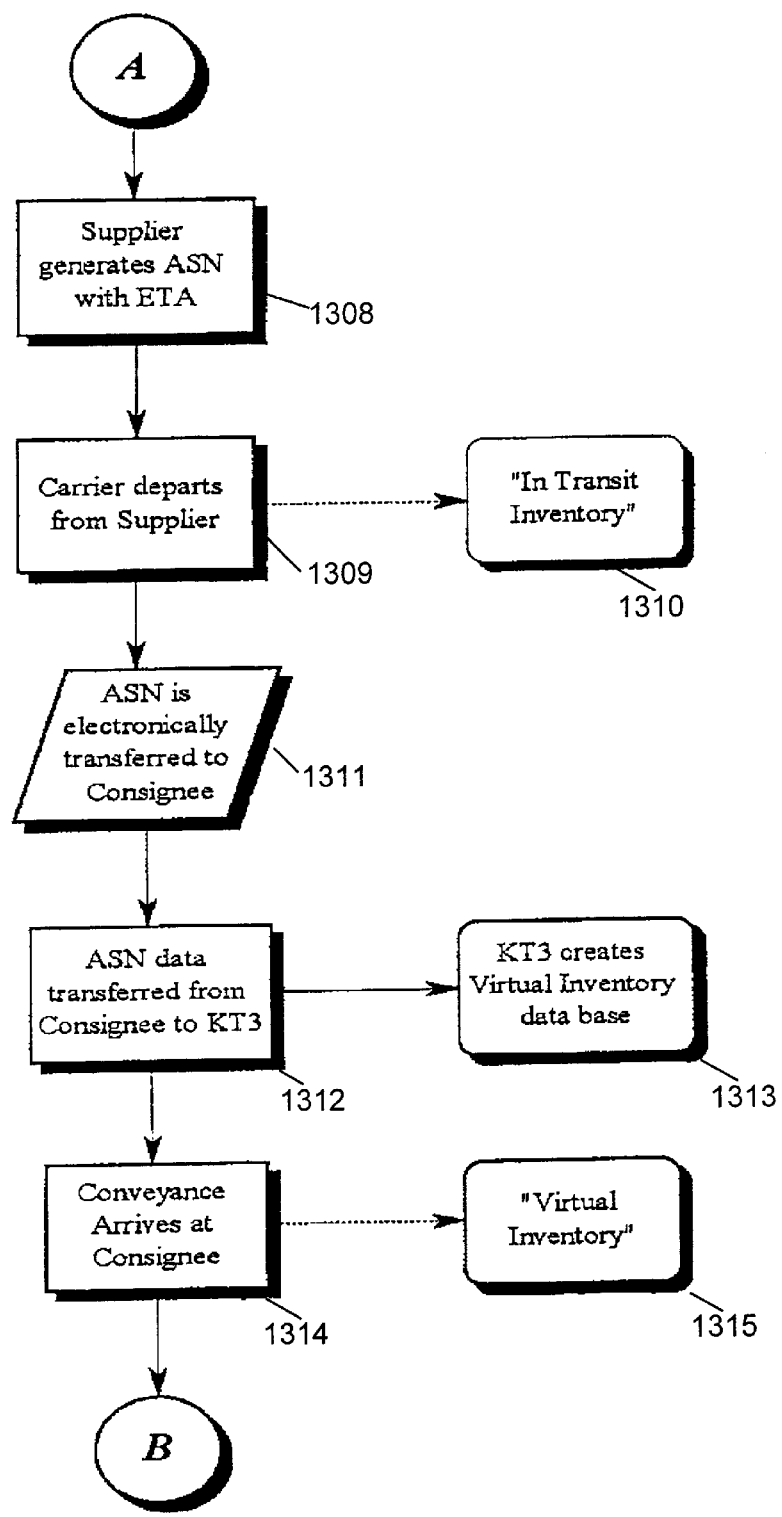

At step 1308 on FIG. 13B, the supplier generates an advanced shipping notice (ASN) for transmission to the customer. The ASN includes the part number, supplier code, release order, purchase order number, quantity shipped, destination and estimated time of arrival (ETA) at the consignee's or customer's facility. When the carrier departs from the supplier at step 1309 the shipment is noted as "in transit" at step 1310. The ASN is electronically transferred to the consignee/customer at step 1311. The ASN is loaded into a virtual inventory database 13 in the CMCS (FIG. 2) at step 1312. Additional data resident in the virtual inventory database may include the location of the supplier and the a calculated ETA based on that location, associated carriers and type or size of containers, and rack information. This data may be redundant, related or in addition to the data supplied by the ASN. The inventory is "virtual" in the sense that the CMCS knows that it is scheduled to become inventory prior to its physical arrival, as a result of receipt of the advance shipping notice (ASN). When the shipment physically arrives at the site at step 1314, the recording of the carrier and container ID as described above creates a "virtual inventory" record at step 1315. This inventory is "virtual" in the sense that although it is physically at a facility, i.e., in a container which is sitting in a yard or on a pier next to a building which is the assembly or transfer site, it is "near" inventory because it is not inside the building, or grouped together with like parts in a storage or assembly line spot, but is nonetheless accounted for by the system.

Figure 13C:
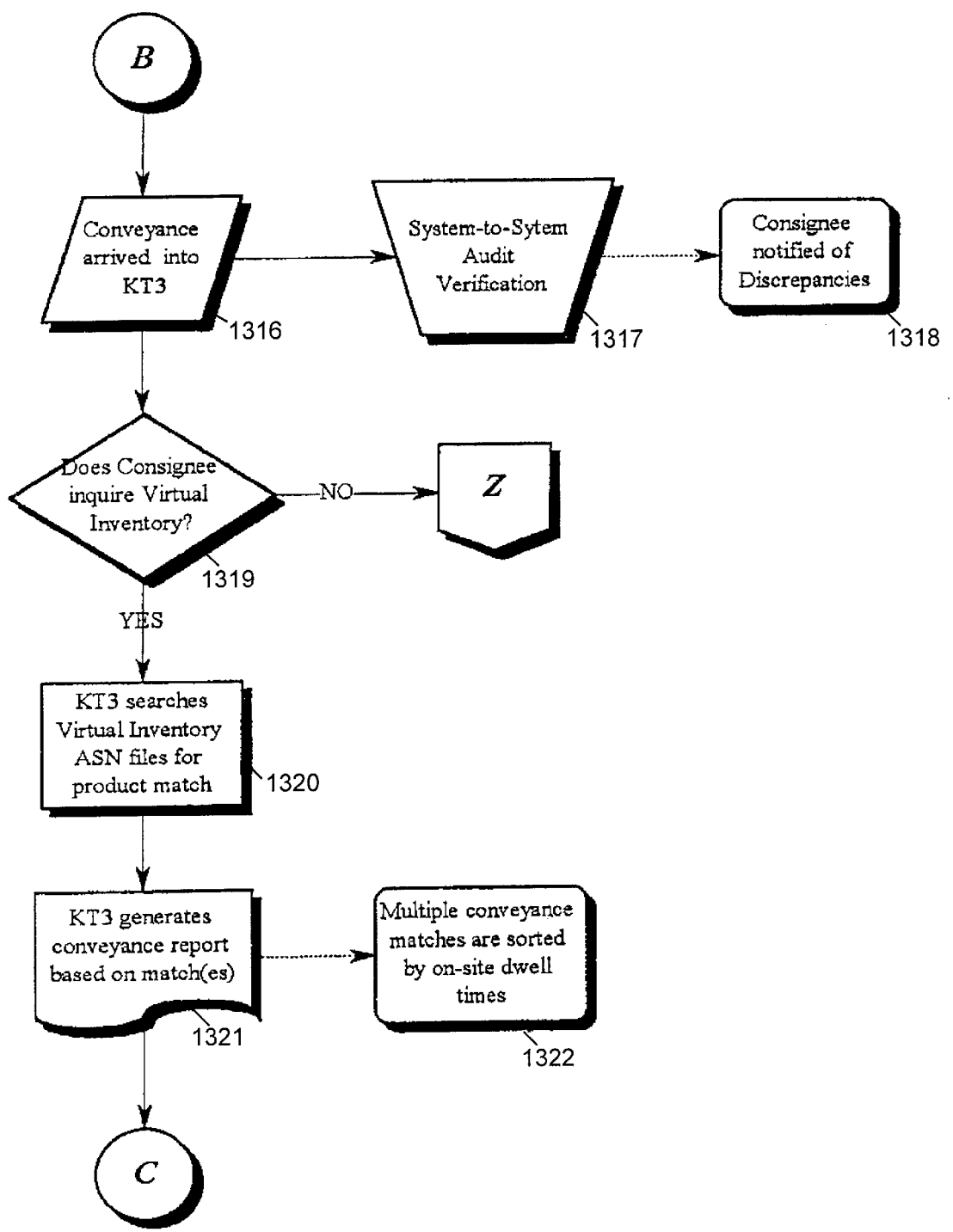
Figure 13D:
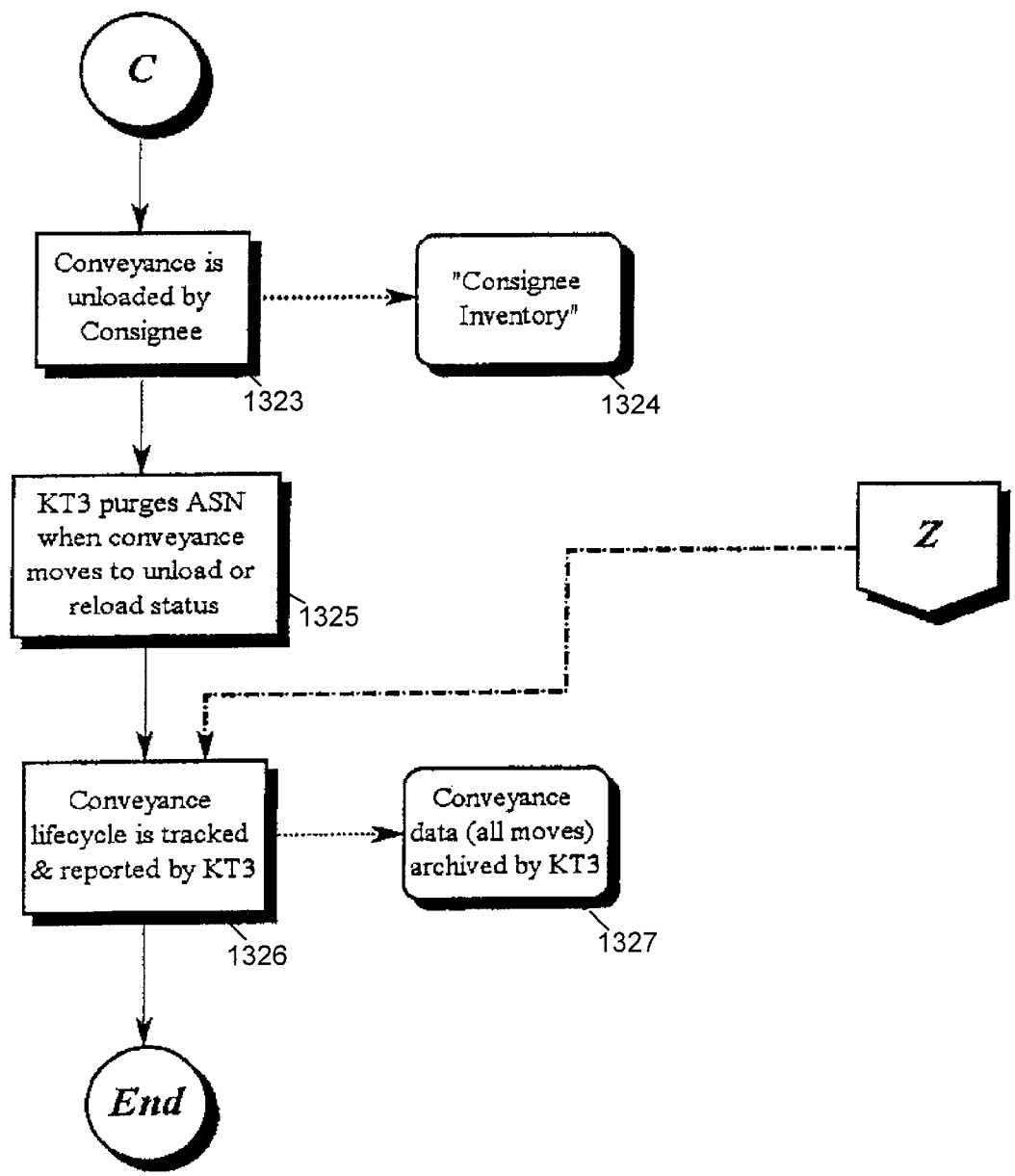

The physical arrival of a container at step 1314 is entered into the CMCS at step 1316 (FIG. 13C). By matching the conveyance arrival data (carrier and container ID) with the ASN data received from the carrier, the CMCS performs a system-to-system audit verification at step 1317, and is able to notify the customer/consignee of any discrepancies at step 1318. A carrier may query the CMCS virtual inventory 13 at step 1319 by entering the ASN data for a particular shipment. This prompts the system to search the virtual inventory ASN files for product match at step 1320, and to generate a conveyance report at step 1321 based upon accurate matches of ASN/virtual inventory data. Simultaneously, at step 1322, multiple conveyance product matches are converted to total product so that the consignee can be alerted to overstock and/or overshipment of product, and thereby reduce further purchase order or release from a blanket purchase order.

When the conveyance or container is unloaded at step 1323 (FIG. 13D) it becomes consignee/customer "in facility" inventory at step 1324. The unloading is noted by the switching operations described above. The system then purges the corresponding ASN once the container is noted as (fully) unloaded or reload status at step 1325. With the shipment completed, the system is able to produce a conveyance life cycle report at step 1326, and record the report in an archive at step 1327.

The advantage of the described virtual inventory aspect of the system is that it provides real-time data on all inventory regardless of its location, i.e., in transit, at a facility, or in a facility. This is the only way to keep an accurate accounting of the total real time value of the supplier's, carrier's, business, and customer's businesses. The virtual inventory aspect of the invention is thus a method to assist a customer's management in inventory control. The customer can "view" all inventory(whether physically in stock or not) less all inventory committed to production or delivery as "real inventory". Customer savings are realized from inventory reductions (i.e., a reduction of carrying costs including interest, insurance and taxes), the possible elimination of offsite storage facilities, or the need to rent or build additional space, potential reduction in required warehouse space and the associated costs, and avoidance of safety issues involved with warehousing of excess inventory, including insurance, worker's compensation and related litigation.

The ordinary payment procedure of customers, such as automobile manufacturers, is to pay for parts delivered only upon proof of receipt. The proof of receipt is ordinarily a bill of lading which accompanies the shipment. A bill of lading is a receipt which a carrier gives to a supplier/shipper for goods given to the carrier for delivery. The bill of lading evidences the contract between the shipper/supplier and the carrier, and can also serve as a document of title creating in the person possessing the bill ownership of the goods shipped. The bill of lading is ordinarily presented to the customer upon delivery of the shipment by the carrier. This procedure is complicated by the following circumstances, a) where the container is left at the customer's yard for some period of time before it is unloaded, b) where the customer and supplier agree that payment for the goods will not be made until the goods are unloaded (completely) into the customer's facility, or c) where the carrier must return the container with racks which belong to the customer or the supplier. Of particular importance is the information on "racks outbound" (RO) from a facility, as this impacts directly on the future flow of parts to the facility.

Complex paper-based systems have been devised to confirm receipt and unloading of goods, and reloading of racks (correct in number and type) into returning containers. However, any misplacement or oversight of any of the documents required to record the each of the necessary actions to be taken with any given container corrupts the system and ultimately results in a) a loss in inventory to the customer, or b) substantial extra expense to the supplier to correct errors in rack returns. A supplier is just as interested in receiving back the correct type and number of racks as is the customer in receiving the correct type and number of parts. For without the correct racks, a supplier can deliver no more parts.

Figure 14A:
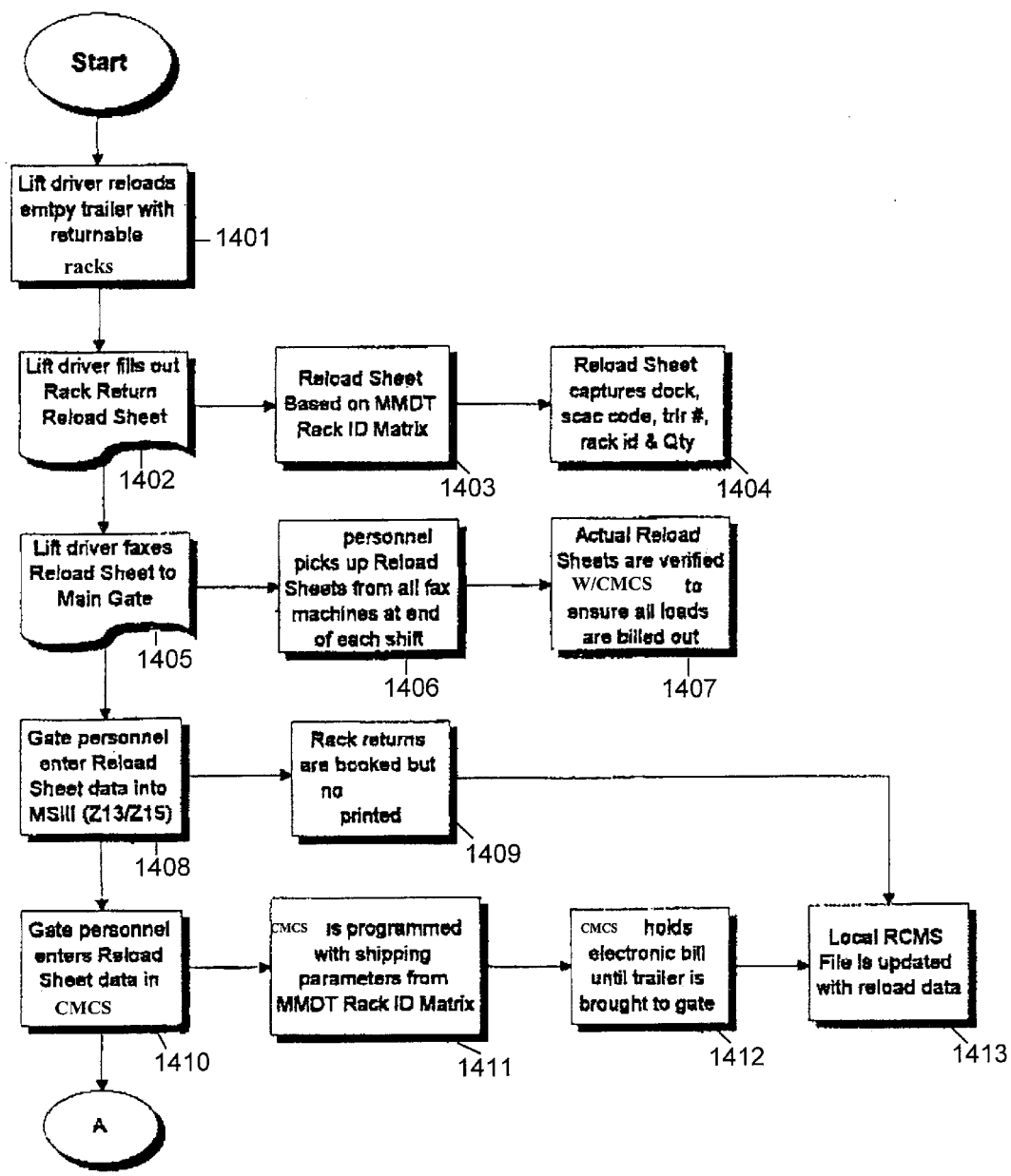
FIGS. 14A–14C are flow diagrams of a process for recording, verifying and producing electronic and paper records for return delivery of shipping racks in accordance with the present invention.

The present invention provides an improved method and system for verifying and document accurate rack return without total reliance on a multiple copy paper chain. As described with reference to FIGS. 14A–14C, at step 1401 a facility worker such as a lift driver reloads an emptied container such as a trailer with returnable racks. A rack return reload sheet (RRRS) is filled out at step 1402. The rack return reload sheet is based on MMDT and a rack ID matrix acquired at step 1403, and a dock number, SCAC code, trailer number, rack identifier and quantity acquired at step 1404. The rack reload sheet is faxed to the facility gate G (FIG. 2) at step 1405 for entry into the CMCS database at step 1406 and verified at step 1407. The rack return reload sheet data is also fed to the customer MIS 12 at step 1408 and "booked" for payment at step 1409. The data from the rack return reload sheet is loaded into the CMCS at step 1410. The CMCS then matches the data to the MMDT rack ID matrix data resident in the database at step 1411. If this information matches then the system produces an electronic bill (of lading) at step 1412 for matching with the corresponding container as it leaves the facility boundaries through the gate. This electronic bill of lading is also transferred to the customer MIS 30 or 60 at step 1413 to provide that system with the latest rack return data. Rather than relying on the carrier's bill of lading and rack return information, the system has generated a bill based upon information received from the person who reloaded the container with empty racks, and cross-checked that information with the MMDT and rack ID data.

Figure 14B:
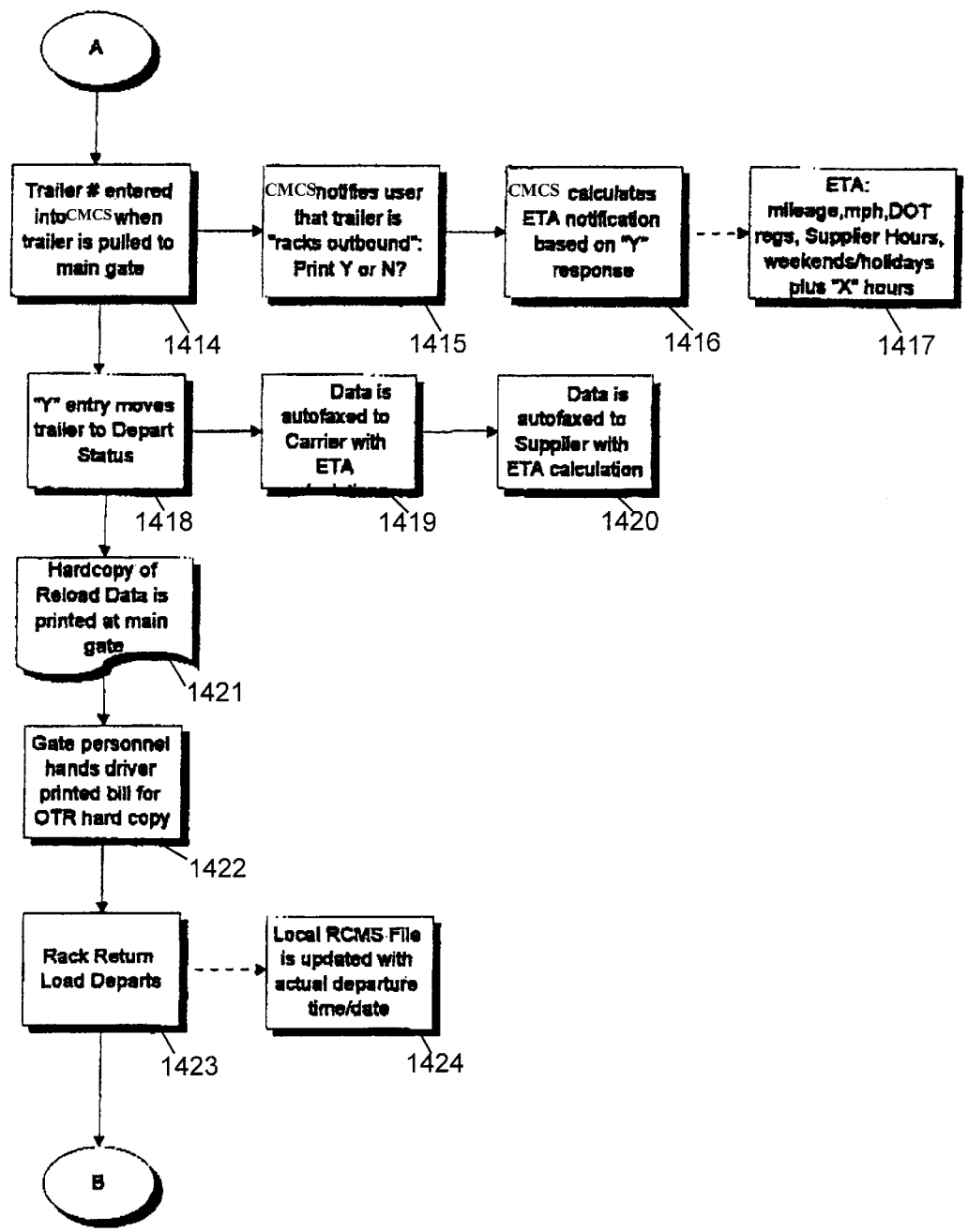

With reference to FIG. 14B, as a rack-carrying container arrives at the facility gate, the container number is entered into the system (manually or automatically) at step 1414. The system notifies the operator at step 1415 that the container is "racks outbound" and asks if an outbound billing memo (i.e., a bill of lading) is to be printed. If the billing memo is requested at step 1416, the system, knowing the return destination of the racks, automatically calculates at step 1417 an estimated time of arrival (ETA) based upon data on mileage, average speed, DOT regulations, supplier business hours, plus an "X" hours buffer time. All of this information is calculated from data resident in the CMCS database. The request for an outbound billing memo at step 1415 updates the container to "depart" status at step 1418, and the billing memo data is automatically faxed to the carrier at step 1419, and to the supplier at step 1420, with the calculated ETA. A hard copy of the billing memo is printed at the gate at step 1421 and handed to the carrier driver at step 1422. The container departs at step 1423, and the customer's record of rack return is updated with the actual time and date of departure at step 1424.

Figure 14C:
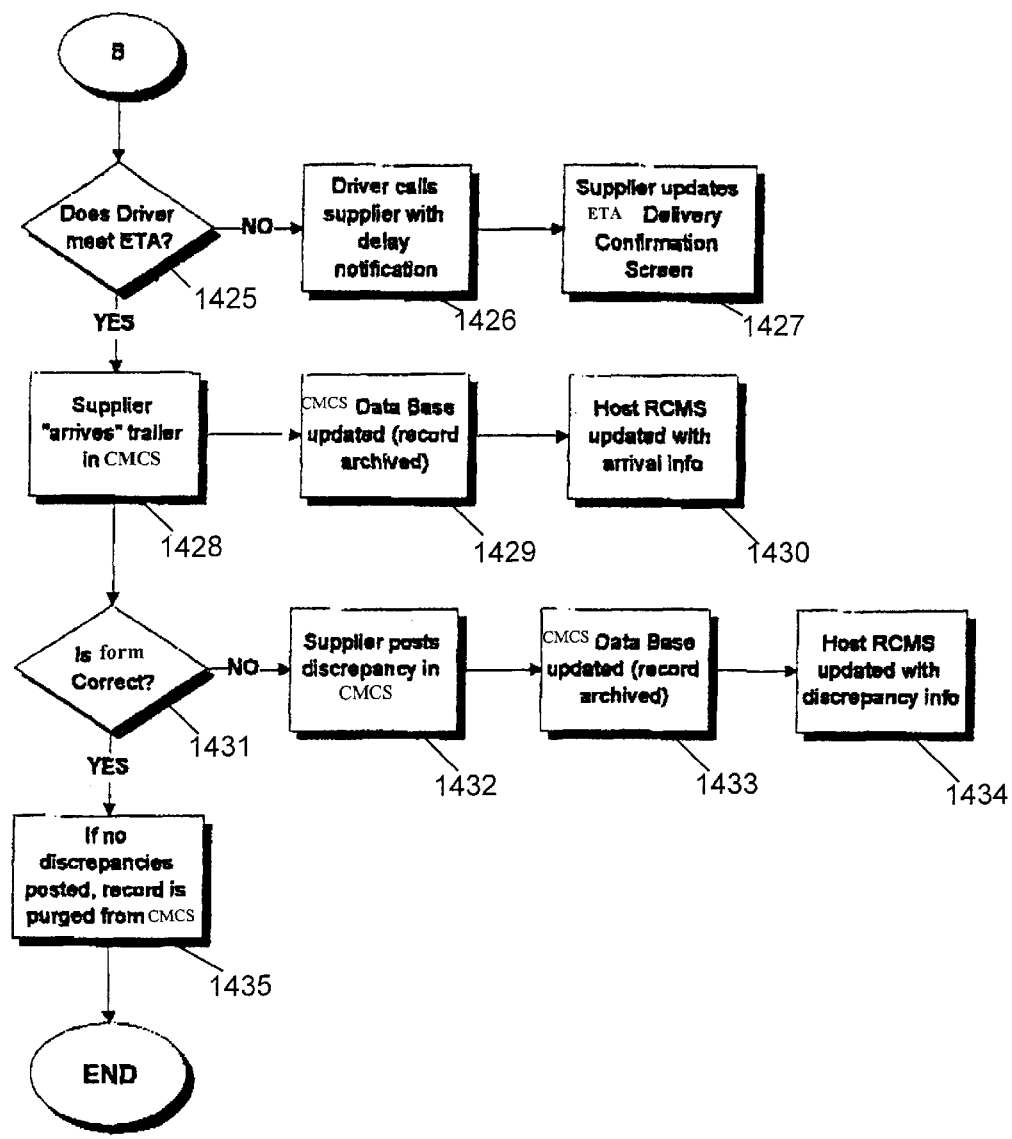

As shown in FIG. 14C, the detailed tracking of rack returns continues all the way back to the supplier. If the carrier driver meets the calculated ETA, at step 1425, the supplier "arrives" the container at step 1428 by notifying the CMCS, electronically or by telephone. If the container does not arrive at the supplier within the ETA, the carrier driver notifies the supplier at step 1426 of the delay, and the supplier adjusts the container ETA in the CMCS at step 1427. If the container does arrive on time (step 1428) the CMCS is notified at step 1429 and the record is archived. The customer rack return record is updated by the CMCS at step 1430. The record at step 1429 is the completion of a delivery transaction from the supplier's perspective, as the timely return of the racks is an absolute prerequisite to future shipments.

To confirm that the correct type and number of racks have been returned in the arrived container, the container contents is physically matched against the record of the billing memo (generated at step 1421 in FIG. 14B) at step 1431. If there is a discrepancy, the supplier posts the discrepancy to the CMCS at step 1432, the CMCS database is updated at step 1433, and the customer's rack return records at step 1434. If the container contents match the billing memo, the rack return transaction is both completed and verified, at which point the entire record can be purged from the CMCS at step 1435.

Figure 15:
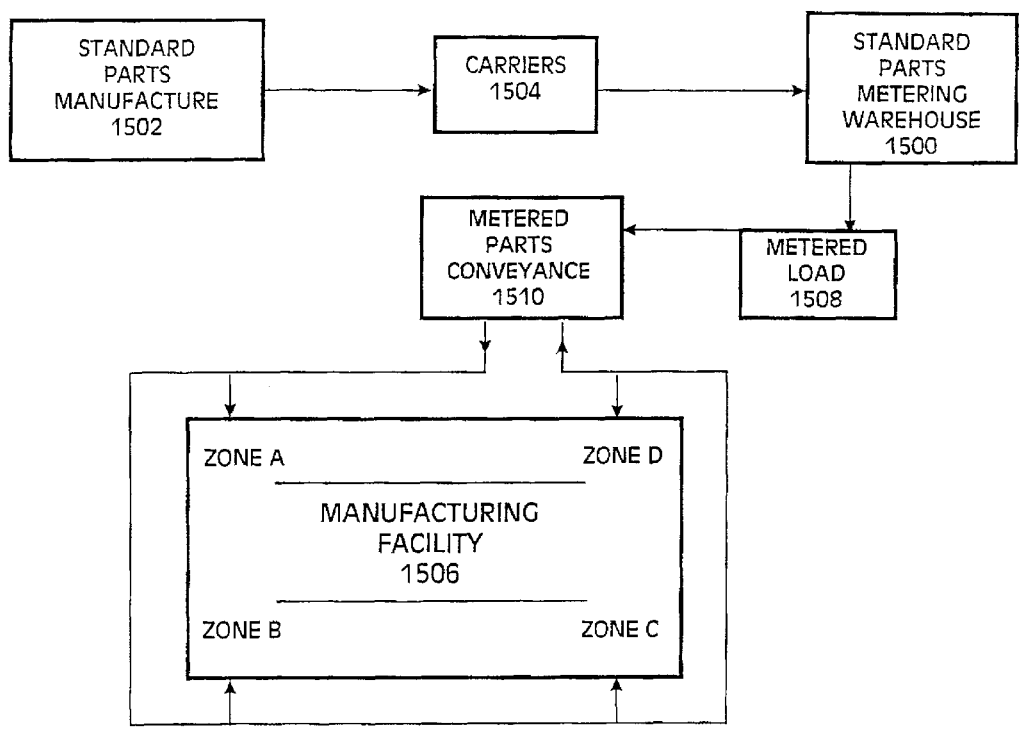
FIG. 15 is schematic diagram of a metered warehousing and parts delivery process and system in accordance with the present invention.

In one further aspect of the invention, described with reference to FIG. 15, a method and system for timed, sequential parts delivery to a manufacturing facility is provided. In the mass assembly of complex products such as automobiles, thousands of parts are needed at certain times and locations within a facility. The quantity and timing of parts requirements is set by the manufacturer, for example by a weekly schedule. Timed delivery of relatively large parts, such as engines and body panels, directly from a supplier to the manufacturing facility is accomplished through the described use of ASNs and container monitoring within the facility receiving yards. However, for small parts such as fasteners (also generically referred to as "standard parts"), this approach is not practical. Small parts are therefore typically shipped in bulk quantities which exceed present production requirements and are therefore simply held within the manufacturing facility. This commonly results in substantial losses of excess small parts waiting for assembly. In one particular industry, this "holding" of parts and the resultant losses is estimated to add 15% to the total cost of the parts.

The present invention eliminates the asynchronous delivery of small parts to a manufacturing facility relative to current production by providing a metered warehouse from which small parts are distributed to the manufacturing facility in quantities which correspond to current (daily and weekly) production. As shown in FIG. 15, a metering warehouse 1500 receives parts from standard parts manufacturers 1502 delivered by carriers 1504. The carriers 1504 used by the system are preferably closely affiliated with the manufacturers of the standard parts, with establish "most efficient routes" from the manufacturers 1502 to the warehouse 1500. The warehouse 1500 is preferably in relatively close proximity to a manufacturing facility 1506 where the standard parts will be assembled into a finished product or component.

The warehouse 1500 may have on hand a minimum quantity of standard parts for manufacture of a certain product, based on current trends in manufacturing pace and capacity. Many warehouses are operated under inventory management programs which adjust inventory based upon projected requirements. Although such systems reduce overstocking of parts, they do not address the manufacturer's problem that arises from the delivery of a minimum quantity, such as a carton, to the facility, when only one box of parts from the carton will be used in the day's or week's production. The losses to the manufacturer occur with the parts remaining in the carton, awaiting assembly.

In the present invention, when the warehouse 1500 receives a build order from the manufacturing facility, specifying the exact number of parts required for a production run. A "metered" load 1508 is assembled at the warehouse and delivered to the facility 1506 by metered parts conveyance 1510. The metered load may include an exact quantity of parts required for production for a single or multiple shifts, one day, several days, a week or several weeks or more. Records of the metered load are matched to the build orders. Within the manufacturing assembly there are assembly zones, e.g., Zone A, Zone B, Zone C, etc. The metered load 1508 is loaded onto the parts conveyance 1510 according to a sequence in which the zones at the facility will be reached. This aspect of the system is critical in connection with a manufacturing facility which may be many acres in size, with substantial distances between drop-off points (docks) to the different zones. The load 1508 is dropped at the designated zones in sequence. The timing of the metered load delivery can be matched to a production schedule to accomplish just-in-time delivery. The deliveries are communicated to the manufacturing facility, e.g. through the CMCS, so that the facility has a running record of parts on hand. Each of the zones is then audited periodically to verify that the current zone parts inventory corresponds with completed production runs.

The invention has been described in terms of certain preferred and alternate embodiments which are representative of only some of the various ways in which the basic concepts of the invention may be implemented. Certain modifications or variations on the implementation of the inventive concepts which may occur to those of ordinary skill in the art are within the scope of the invention and equivalents, as defined by the accompanying claims.

What is claimed is:

1. A computerized system for monitoring and recording location and load status of shipping containers relative to a facility with an associated yard defined by a boundary within which containers are to be monitored by the system, and a controlled entry point to the boundary, the system comprising:

means for recording identification codes of containers which enter the boundary, means for communicating and recording information on movements, location and load status of containers within the boundary in response to movement and changes in location and load status of containers made according to instructions received from the facility, means for generating reports of recorded information on locations and load status of containers within the boundary, and means for generating reports on container locations and load status relative to designated docks associated with a facility.

2. The system of claim 1 wherein the reports on container locations and load status relative to designated docks associated with a facility are presented as dock availability reports which list a plurality of dock designations and an identification code of a container associated with a designated dock.

3. The system of claim 1 wherein movements of containers within the boundary are recorded in the form of a carrier dock activity report which displays a number of containers located at a dock of a facility during a designated day, a starting point of a container prior to arriving at a dock, a load status of the container as it was removed from a dock, and a number of switches of container during the designated day.

4. The system of claim 1 wherein movements of containers within the boundary are recorded in the form of a dock activity report which for a designated dock on a designated day records an identity of a container brought to the dock, an inbound load status of the container and an outbound load status of the container, an in dock time and an exit dock time, and a dock dwell time.

5. The system of claim 1 wherein movements of containers within the boundary are recorded in the form of a live unload report which records the date, time, dwell time and identification of containers which move from an entry point of the boundary to a dock.

6. The system of claim 1 wherein movements of containers within a boundary are recorded in the form of an arrival count report which records a total number of containers arrived to a facility per a specified time period.

7. The system of claim 6 wherein the arrival count report records a total number of containers arrived to a facility per day.

8. The system of claim 6 wherein the arrival count report records an average number of containers arrived to a facility per day.

9. The system of claim 6 wherein the arrival count report records a total number of containers arrived to a facility per hour.

10. The system of claim 6 wherein the arrival count report records an average number of containers arrived to a facility per hour.

11. The system of claim 6 wherein the arrival count report records an average number of containers arrived to a facility per hour per a twenty-four hour period.

12. The system of claim 1 wherein the arrival count report records a total number of containers arrived to a facility per hour per day.

13. The system of claim 1 wherein the arrival count report records an average number of containers arrived to a facility per hour per day.

14. The system of claim 1 wherein movements of containers within a boundary are recorded in the form of a switch count report which records a total number of container switches per a specified period of time.

15. The system of claim 14 wherein the switch count report includes a total number of switches per day.

16. The system of claim 14 wherein the switch count report includes an average number of switches per day.

17. The system of claim 14 wherein the switch count report includes an total number of switches per hour per day.

18. The system of claim 14 wherein the switch count report includes an average number of switches per hour per day.

19. The system of claim 1 wherein movements of containers within a boundary are recorded in the form of a live unload exception report which records a container identification, date and time of arrival, date and time of first move, number of moves, date and time of departure, and load status.

20. The system of claim 19 wherein the live unload exception report further comprises a detail page report which includes an archival history of switching and load status of a designated container.

21. A method for using a computer to monitor usage of one or more docks associated with a facility, wherein the usage involves the presence or absence of a container at a dock, the method of comprising the steps of:

(a) recording the presence of an identified container at a particular identified dock, (b) recording the absence of an identified container at a particular identified dock, (c) producing a report which identifies monitored docks and identifies containers present at identified docks, and also identifies docks at which a container is absent.

22. The method of claim 21 further comprising the step of producing a dock availability report which numerically lists one or more docks of a facility and identifies a container present at the identified docks and a carrier associated with the identified containers.

23. The method of claim 21 further comprising the steps of producing a report for a selected dock which indicates a total number of containers brought to the selected dock during a specified time period.

24. The method of claim 21 further comprising the step of producing a report for a selected dock which indicates a total number of containers removed from the selected dock during a specified time period.

25. The method of claim 21 further comprising the step of producing a report for selected docks which indicates a total number of containers left at the selected docks during a specified time period.

26. The method of claim 21 further comprising the step of producing a report which indicates a load status of containers removed from identified docks.

27. The method of claim 26 wherein the load status is selected from the group consisting of partial load, empty load, empty racks, and live unload.

28. The method of claim 21 further comprising the step of producing a report which indicates a total number of switches for an identified container before or after the container is brought to an identified dock.

29. The method of claim 21 further comprising the step of producing a dock activity report for a particular dock which indicates the date and time of arrival of an identified container at the dock, the date and time of departure of the container from the dock, and a total time the container was at the dock.

30. The method of claim 29 wherein the dock activity report further includes the identity of a yard from which the identified container was moved to the dock, and the identity of a yard to which the container was moved from the dock.

31. The method of claim 21 wherein the report produced is a live unload report which identifies containers which are taken directly to an identified dock upon arrival at a facility and which further indicates an IN DOCK TIME, an EXIT DOCK TIME and a DWELL TIME.

32. A method of generating a live unload exception report for monitoring containers intended to be unloaded at a dock of a facility upon arrival at the facility without being first placed in a yard associated with the facility, but which were switched at least once before arriving at a dock, the method comprising the steps of:

(a) identifying live unload containers from information received by an advance shipping notice, (b) recording a date and time of arrival of an identified live unload container, (c) recording a date and time of contact with the live unload container by a switcher which flags the container as a live unload exception, and (d) recording a total number of switches of the container before the container arrives at a dock.

33. The method of claim 32 further comprising the steps of recording the date and time of departure and load status of a live unload exception container.

34. The method of claim 32 further comprising the step of recording for the live unload exception report for an identified carrier and container at least one of the items selected from the group of: load status, yard location, date and time of switches, arrival, last move, retention/detention, unload, loading or partial unloading of racks, completed reload, or departure.

35. A method of monitoring receiving yards for shipping containers with respect to the presence and location of containers within a yard having a plurality of slots wherein each slot is adapted to hold at least one container, the method comprising the steps of providing a graphical representation of a receiving yard including identified slots within the yard and identifying one or more containers associated with the identified slots, whereby location of containers within a yard can be determined.

\* \* \* \* \*